United States Patent
Cory et al.

(10) Patent No.: US 11,473,215 B2
(45) Date of Patent: Oct. 18, 2022

(54) SAW GIN STAND SEED ROLL MONITORING FEATURE

(71) Applicant: Lummus Corporation, Savannah, GA (US)

(72) Inventors: Mark David Cory, Bluffton, SC (US); Harold Eugene Davis, Jr., Lyons, GA (US)

(73) Assignee: Lummus Corporation, Savannah, GA (US)

( * ) Notice: Subject to any disclaimer, the term of this patent is extended or adjusted under 35 U.S.C. 154(b) by 477 days.

(21) Appl. No.: 16/688,484

(22) Filed: Nov. 19, 2019

(65) Prior Publication Data

US 2021/0148008 A1 May 20, 2021

(51) Int. Cl.

| | |
|---|---|
| *D01B 1/08* | (2006.01) |
| *G01F 1/7086* | (2022.01) |
| *G01K 13/00* | (2021.01) |
| *G01N 9/36* | (2006.01) |
| *G01F 1/00* | (2022.01) |

(52) U.S. Cl.
CPC ............ *D01B 1/08* (2013.01); *G01F 1/7086* (2013.01); *D10B 2201/02* (2013.01); *G01F 1/00* (2013.01); *G01K 13/00* (2013.01); *G01N 9/36* (2013.01)

(58) Field of Classification Search
CPC ............ D01B 1/04; D01B 1/08; G01F 1/7086
See application file for complete search history.

(56) References Cited

U.S. PATENT DOCUMENTS

| | | | | |
|---|---|---|---|---|
| 117,058 | A * | 7/1871 | DuBois | D01B 1/08 19/58 |
| 2,137,744 | A * | 11/1938 | Streun | D01B 1/08 19/56 |
| 2,207,031 | A * | 7/1940 | Steinhauer | D01B 1/08 19/56 |
| 4,433,454 | A * | 2/1984 | Salmon | D01B 1/08 19/55 R |
| 4,967,448 | A * | 11/1990 | Mizer | D01B 1/08 19/40 |
| 7,810,217 | B2 * | 10/2010 | Cory | D01B 1/08 19/55 R |
| 2010/0058559 | A1 * | 3/2010 | Cory | D01B 1/08 19/62 A |
| 2017/0137969 | A1 * | 5/2017 | Cory | D01B 1/08 |

* cited by examiner

*Primary Examiner* — Shaun R Hurley
(74) *Attorney, Agent, or Firm* — Laurence P. Colton; Smith Tempel Blaha LLC

(57) ABSTRACT

A system and method includes a seed roll of a saw type gin stand which can easily be inspected in an efficient and safe manner within the normal course of operation. The monitoring of the seed roll is desirable for prediction of irregularities that could significantly hamper the production of a ginning facility. This monitoring can take place by manual inspection with the eye or touch of the operator. In addition, this feature will facilitate the opportunity to introduce a new automatic process by which the control system can monitor the seed roll in order to improve overall productivity of the gin stand.

27 Claims, 18 Drawing Sheets

SAW GIN STAND SEED ROLL MONITORING FEATURE

BACKGROUND OF THE INVENTION

Technical Field

This invention is generally directed to a saw-type gin stand for processing seed-cotton to remove the seeds from the fiber. In addition, this invention relates to the construction and features associated with the area within the gin stand referred to as the roll box, and more specifically to the doors within this chamber where seed-cotton is introduced, and from which the fiber is extracted and the seeds are ejected.

Prior Art

The process of picking cotton and removing seeds, trash and other foreign materials from the seed-cotton is well known and understood by one of ordinary skill in the art. After seed-cotton is harvested, it is then transported from the field to a cotton ginning facility. This facility has an apparatus for receiving the seed-cotton, drying and cleaning the seed-cotton, removing the seeds from the cotton fiber or lint, cleaning the lint, and pressing the lint into bales for transport to warehousing, and later sold for commonly processing into yarn, thread, and fabric.

Central to the processes found in the type of cotton ginning facility relating to the present invention is the machine which separates the seed from the cotton fiber. This machine is referred to as a saw-type ginning stand, or simply, a gin stand.

A typical commercial gin stand currently in use is shown in cross section in prior art FIG. 1. Referring to FIG. 1, a gin stand 10 typically comprises an inlet chute 11 wherein seed-cotton enters the machine in a single-locked or separated state, and at a controlled rate. The seed-cotton is thrown by a picker roller 12 onto a gin saw cylinder 13, comprised of many spaced apart circular saw blades 14 having teeth along their periphery and rotating about a common axis 15. The seed-cotton is carried upward on the periphery of the saw blade through the seed discharge shaft 16 into the lower portion of the roll box 17 directly below the agitator (or oscillator) cylinder 18. The circumference of the roll box 17 is defined in part, by the oscillator-facing surfaces of the ginning ribs 19, upper rib rail scroll 20, upper roll box door 21, front roll box door 22, and the seed fingers (or seed panel) 23. The multitude of saw blades 14 rotate between closely spaced stationary ginning ribs 19 which serve to strip a portion of the cotton fibers from each seed as the saw teeth and attached fibers pass between the closely spaced ribs.

The partially ginned seeds are larger than the gap between the ribs 19 and become part of a seed roll rotating around the axis of the oscillator cylinder 18. The fibers remaining on the partially ginned seed tends to keep the seed loosely attached to the seed roll, which is a large mass made up of seeds with varying amounts of fiber remaining. Each seed will rotate around the roll box 17 a multitude of times until it no longer has enough long fiber to keep it adhered to the seed roll, at which time it will fall out through the seed discharge shaft 16 and pass out of the bottom of the machine.

The cotton fiber passing between the ribs 19 will remain attached on the periphery of the saws until doffed off the saw teeth by a counter-rotating brush cylinder 25. The surface speed of the brush cylinder 25 is greater than the tip speed of the saw cylinder 13, which allows the cotton to be lifted off the teeth of each saw blade 14 and passed out of the machine through the lint outlet 26.

The upper roll box door 21 pivots about hinge pin 27. The front roll box door 22 pivots about hinge pin 28. The seed fingers (or seed panel) 23 pivots about hinge pin 29. The upper roll box door 21 includes a cap plate 34 (see FIG. 3) at each extremity. The upper roll box door 21 is secured in the closed position by virtue of each cap plate being trapped by the front roll box door 22. These features can also be seen more closely in FIG. 3.

As best illustrated in FIG. 3, the top of the roll box area typically has an opening 24 where the seed roll can be observed when seed-cotton is not being fed into the gin stand, or at the very least touched by the fingertips of an operator. In current high capacity gin stands, this opening is normally smaller than in generations past for multiple reasons. One of these reasons is to prevent the operator from being injured or able to reach any moving parts when the machine is in operation. Another reason is to streamline the path of the outer surface of the seed roll to reduce drag and increase throughput. The smaller opening on a modern gin stand makes visual observation of the seed roll impractical even when the flow of incoming seed-cotton is interrupted or diverted.

It is desirable for an experienced operator (ginner) to be able to both see and touch the seed roll on regular intervals, particularly when ginning wet or trashy cotton in order to prevent damage to the machine or to prevent a fire created by the friction between the gin saws and a tag, which is normally made up of either cotton or trash inadvertently trapped on a stationary surface on or near the rib at a point where the spinning saw passes. If there is a tag, the perimeter surface of the seed roll will have an elevated temperature or change in density at the point directly corresponding to the tag on the rib or rib rails beneath. A seasoned ginner can detect this rise in temperature or change in density by touch. The seed roll can also be discolored, or the surface pattern can be visually disrupted in the area over a tag.

While this type of fire is frequently referred to as a rib fire, the rib itself is typically made of iron or steel and is not the source of fuel for the fire. The cotton fiber itself and/or organic trash made up of leaves, sticks, or hulls is generally the source of fuel for a rib fire. This fire can quickly spread inside the ductwork and ignite the cotton being pneumatically conveyed to subsequent processes, thus causing a loss of finished bales or damage to the gin stand and downstream equipment.

As best seen in FIG. 15, a prior art gin stand 10 is fed cotton by the prior art extractor feeder 60. Seed-cotton enters the extractor feeder 60 from a hopper above through the inlet 61 at a controlled rate, and exits the machine through the outlet 62, passing onto the upper feeder apron 63, and slides down onto the pivotably attached lower feeder apron 64 before becoming airborne and falling into the inlet 11 of the gin stand 10 directly below. In comparing the close-up view as seen in FIG. 3 of the same gin stand 10 it can be demonstrated that the lower apron can preclude the operator's line of sight 36 into the narrow opening 24 of the seed roll in roll box 17. Furthermore, the lower apron interferes with opening the roll box doors 21 and 22 and presents a hindrance to physical access to the roll box area. It is for these reasons the lower apron 64 is hinged about pivot point 65 and can be manually raised in the direction indicated to allow access for inspection and servicing.

In the interest of preventing rib fires, the ginner (or operator) may occasionally elect to stop the feed of seed-cotton, pull the gin stand breast 30 away (this includes the seed roll) from the saws and manually flip up the feeder apron above the gin stand, unlock both ends of the upper roll box door, and open the upper (and front if so equipped) roll box door(s), laboriously break up the seed roll (made up of seed both with and without the valuable lint attached) along the entire width of the machine allowing the seed to exit the roll box 17 downward through the seed discharge shaft 16 and exit the machine, thus allowing the ginner to inspect the upper end of the ribs 19 for tags. As best seen in FIG. 3 (with the breast in the ginning position), the area of interest at the upper end of the rib to inspect for tags is both at, and just above the ginning point 35 where the tips of the saw teeth pass between the ribs 19. During normal operation, the upper end of the ribs cannot be seen by the operator through the opening 24 due to the water-fall-like flow of seed-cotton from above falling into the inlet chute 11, the orientation of the opening 24 as it relates to the operator's typical line of sight 36, the existence of a semi-solid seed roll inside the roll box 17 area surrounding the oscillator cylinder 18, and the oscillator cylinder 18 itself.

Due to the high volume of cotton being fed into modern gin stands, it is impractical for an operator to reach through the stream of seed-cotton being fed into the front of the gin stand and touch the seed roll through opening 24 without inadvertently diverting a portion of the seed-cotton onto the floor (instead of into the gin stand and thusly into the seed roll). Additionally, the density of the seed roll can be locally lowered directly beneath the ginner's hand if the stream of seed-cotton into the seed roll is blocked for more than just a few moments, which can potentially cause the thin spinning saws to lean to one side bringing them into contact with the ribs, thereby causing metal-to-metal contact, friction, sparks, and fire even without a tag being present.

As there are a large number of machines and systems in a cotton gin processing system that handles a highly variable agricultural product under a wide variety of conditions, it is not unusual for the feed of seed-cotton into the gin stand to be interrupted from time to time. While these interruptions are highly undesirable, and while they can be minimized, they cannot be eliminated altogether. As best seen in FIG. 2, when the feed stops, the gin stand breast 30 is pulled out (or rotated out about pivot point 31 depending on the model of gin stand) and the roll box 17 area (or roughly tubular-shaped cavity surrounding the oscillator cylinder 18) is pulled away from the saws 14 to halt the ginning process, thereby helping maintain the integrity and density of the seed roll, which is highly desirable for a number of operational reasons. It is in this state that the operator can best visually see the condition and touch the surface of the seed roll through the narrow opening 24.

When the breast 30 is rotated out and the spinning saws 14 are out of reach below the surface of the ribs 19, the operator can gain increased access to inspect the seed roll if the upper and front roll box doors 21, 22 are opened. It should be noted that some brands and models of gin stands may have only one roll box door 21 or 22 (an upper or a front) instead of both an upper and a front roll box door 21, 22. Having both doors 21, 22 allows for greater access to view the seed roll, and when the seed roll is not present it allows for improved visibility of the ribs 19 and access to all parts of the roll box area for maintenance. This difference in access can be demonstrated as seen in FIG. 4 and FIG. 5. As best seen in FIG. 4, where only a front roll box door 22 is opened and the upper roll box door 21 remains closed as if it were a stationary panel, angle X can be used to represent the degree of operator access to the oscillator cylinder 18. As best seen FIG. 5, both an upper roll box door 21 and a front roll box door 22 is opened to demonstrate a significantly greater degree of operator access as represented by angle Y.

As seen in FIG. 6 and FIG. 7, a version of the prior art includes a toggle link 37 that is pivotably attached to each end plate of the front roll box door 22. The opposite end of each toggle link 37 has an extended pin 38 which can be locked into a U-shaped notch 41 into both of the end heads of the breast 30. Pivotably attached on the outside of each breast end head is a manual locking handle 39 that also has a complimentary U-shaped notch 41 through which the extended pin 38 can also be locked, thus holding the front and upper roll box doors into place. In order to open a set of closed and locked roll box doors, the operator will first need to rotate the handle 39 in the direction as best shown in FIG. 6, which will push the extended pin 38 upward, thus allowing rotation of the toggle link 37 as shown to free the extended pin 38 from engagement with the U-shaped notch 41 in the end head of the breast. After the toggle link 37 is rotated as indicated in FIG. 6, the front roll box door 22 can be opened in the direction as best seen in FIG. 7, and can be secured in place by allowing the extended pin 38 to rest once again in the U-shaped notch 41, resulting in the orientation of the front roll box door 22 resting in the open position as previously seen in FIG. 4.

It is not uncommon for the control system on a modern saw-type gin stand similar to the prior art shown in FIG. 1 to include a means of measuring the electrical amperage or energy being consumed to turn the oscillator 18 (or agitator) cylinder. This information can be used as the only, or just one of multiple inputs used to determine a desirable change in the feed rate of seed-cotton into the gin stand. As the density of the seed roll increases to a practical limit, the amount of lint being removed from the seeds increases. An estimate of the relative density of the seed roll can be determined by monitoring the energy required to turn the oscillator (or agitator) cylinder. From this calculation, the control system will attempt to estimate an infeed in an effort to reach an optimal feed rate to maximize the lint removal without reaching the practical limits of any of the drive components or causing damage to the gin stand or the seed-cotton.

Due to the unique characteristics of each make and model of gin stand, and the slight variations in two gin stands of the same make and model, no two gin stands experience identical power requirements at the same feed rate. Unfortunately, variations in ambient temperature, moisture levels in the seed-cotton, the unique characteristics of each different variety or cultivar of seed-cotton, seed-cotton density at the infeed point, and a host of other variables related to growing conditions makes it almost impossible to determine in advance exactly what the seed roll density and other seed roll characteristics will exist at any point in time during the ginning process using the control technology and process described here.

BRIEF SUMMARY OF THE INVENTION

An object of the present invention is to offer a novel means by which to allow the operator greater access to visually monitor the seed roll.

It is another object of this invention to offer this improved access without allowing the operator to touch any parts inside the roll box that are still in motion.

A further object of this invention is to offer this improved access within the normal course of operation, that is to not require the ginning process to stop more frequently than it might otherwise.

Another object of this invention is to offer this improved access easily and quickly in an automatic fashion at a predetermined point in time or during a desirable point within the normal course of operation.

Yet another object is to introduce a means by which an innovative automated process can be employed to sense various qualities of the seed roll while in operation.

Another object is to introduce a means by which an innovative automated process can be employed to sense various qualities of the seed roll when the breast is out.

Another object of this invention is to offer this innovative automated process to sense various qualities of the seed roll at a predetermined point in time or during a desirable point within the normal course of operation.

Yet another object is to offer an automatic process by which the feed rate of seed-cotton into the gin stand can be altered based on the feedback from a seed roll sensor.

A further object is to provide feedback information to the control system with a seed roll sensor by which various mechanical adjustments can be made, to include but not limited to the revolutions per minute of variously independently adjustable shafts.

Another object of this invention is to incorporate a feature into the front roll box door by which the seed roll can be broken to ease its removal.

These features, and other features and advantages of the present invention will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

The features and advantages of the invention will become apparent from the following description taken in connection with the accompanying drawings in which.

DETAILED DESCRIPTION OF PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

Figure 8:
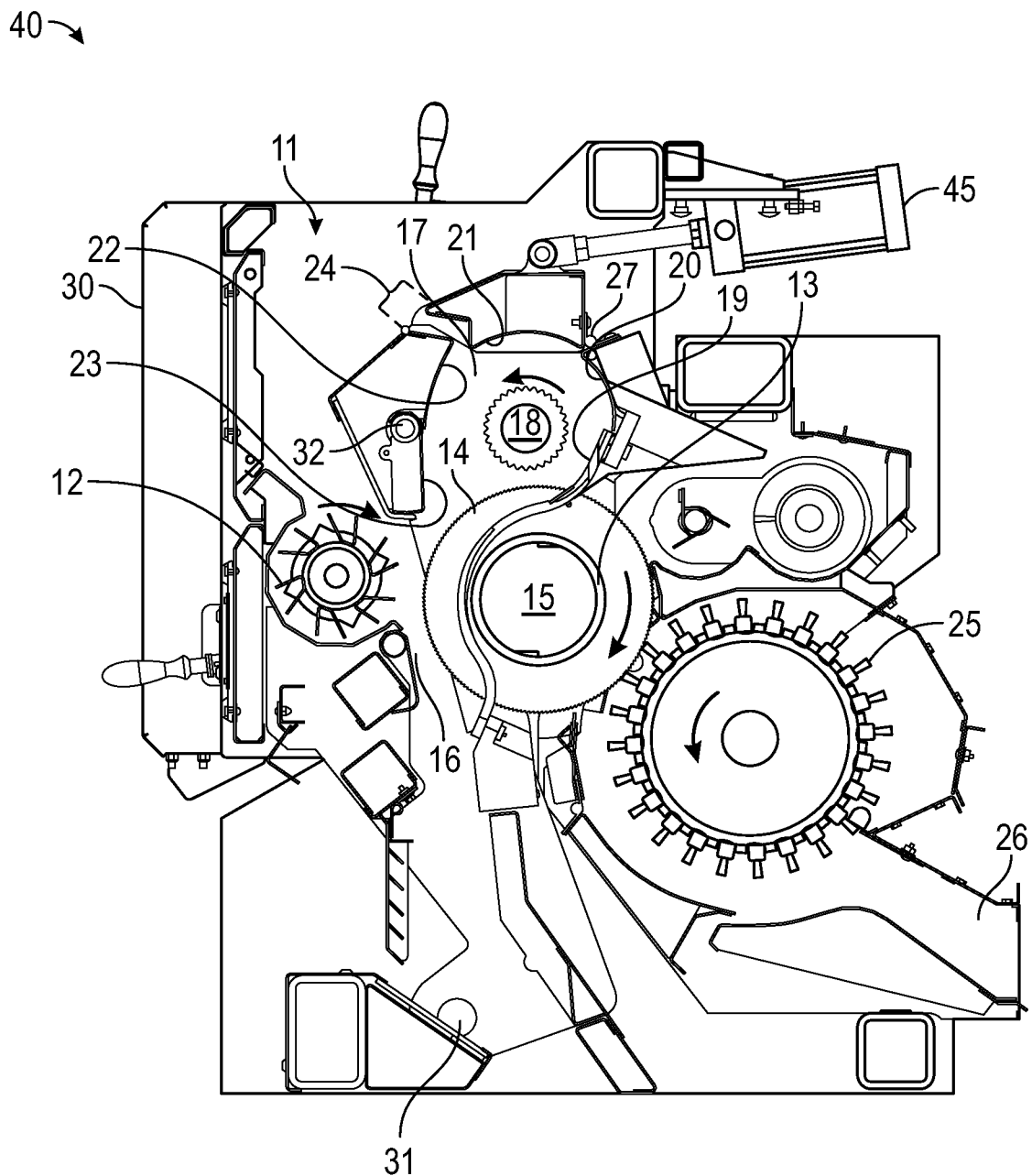
FIG. 8 is a side cross section view of the present invention with the breast in the ginning position.

Referring now to the drawings, wherein the showings are for purposes of illustrating the various embodiments of the present disclosure only and not for purposes of limiting the same, as seen in FIG. 8 the inventive gin stand 40 may comprise an inlet chute 11 wherein seed-cotton enters the machine in a single locked or separated state, and at a controlled rate. The seed-cotton is thrown by a picker roller 12 onto a gin saw cylinder 13, comprised of many spaced apart circular saw blades 14 having teeth along their periphery and rotating about a common axis 15. The seed-cotton is carried upward on the periphery of the saw blade through the seed discharge shaft 16 into the lower portion of the roll box 17 directly below the agitator (or oscillator) cylinder 18. The circumference of the roll box 17 is defined in part, by the ginning ribs 19, upper rib rail scroll 20, upper roll box door 21, front roll box door 22, and the seed fingers (or seed panel) 23. The multitude of saw blades 14 rotate between closely spaced stationary ginning ribs 19 which serve to strip a portion of the cotton fibers from each seed as the saw teeth and attached fibers pass between the closely spaced ribs.

The partially ginned seeds are larger than the gap between the ribs 19 and become part of a seed roll rotating around the axis of the oscillator cylinder 18. The fibers remaining on the partially ginned seed tends to keep the seed loosely attached to the seed roll, which is a large mass made up of seeds with varying amounts of fiber remaining. Each seed will rotate around the roll box 17 a number of times until it no longer has enough long fiber to keep it adhered to the seed roll, at which time it will fall out through the seed discharge shaft 16 and pass out of the bottom of the machine.

The cotton fiber passing between the ribs 19 will remain attached on the periphery of the saws until doffed off the saw teeth by a counter-rotating brush cylinder 25. The surface speed of the brush cylinder 25 is greater than the tip speed of the saw cylinder 13, which allows the cotton to be lifted off the teeth of each saw blade 14 and passed out of the machine through the lint outlet 26.

The upper roll box door 21 includes a cap plate 34 (see FIG. 10) at each extremity. The upper roll box door 21 pivots about hinge pin 27. The front roll box door 22 is fixedly attached to a non-contiguous hinge tube 33 (see FIG. 10) and rotates inside a bearing on the outside of the breast heads. The seed fingers (or seed panel) 23 is fixedly attached to hinge pin 32 and pivots inside hinge tube 33. The upper roll box door 21 includes a cap plate 34 at each extremity. The upper roll box door 21 is secured in the closed position by a piston 45 or similar linear actuating device, or by other movably locking means. The piston 45 may be coupled to a central controller 102 as will be described below in connection with FIG. 20. These features can also be seen more closely in FIG. 10. The front roll box door is also secured in the closed position by a piston or similar linear actuating device, or by other locking means. One possible arrangement can be seen in FIG. 14 where the hinge tube 33 (which is fixedly attached to the front roll box door 22 inside the machine) passes through the end heads of the breast 30 and is attached to lever arm 47 which can be movably held in a position by piston 46. Piston 46 also may be coupled to a central controller 102 as will be described below in connection with FIG. 20.

Figure 12:
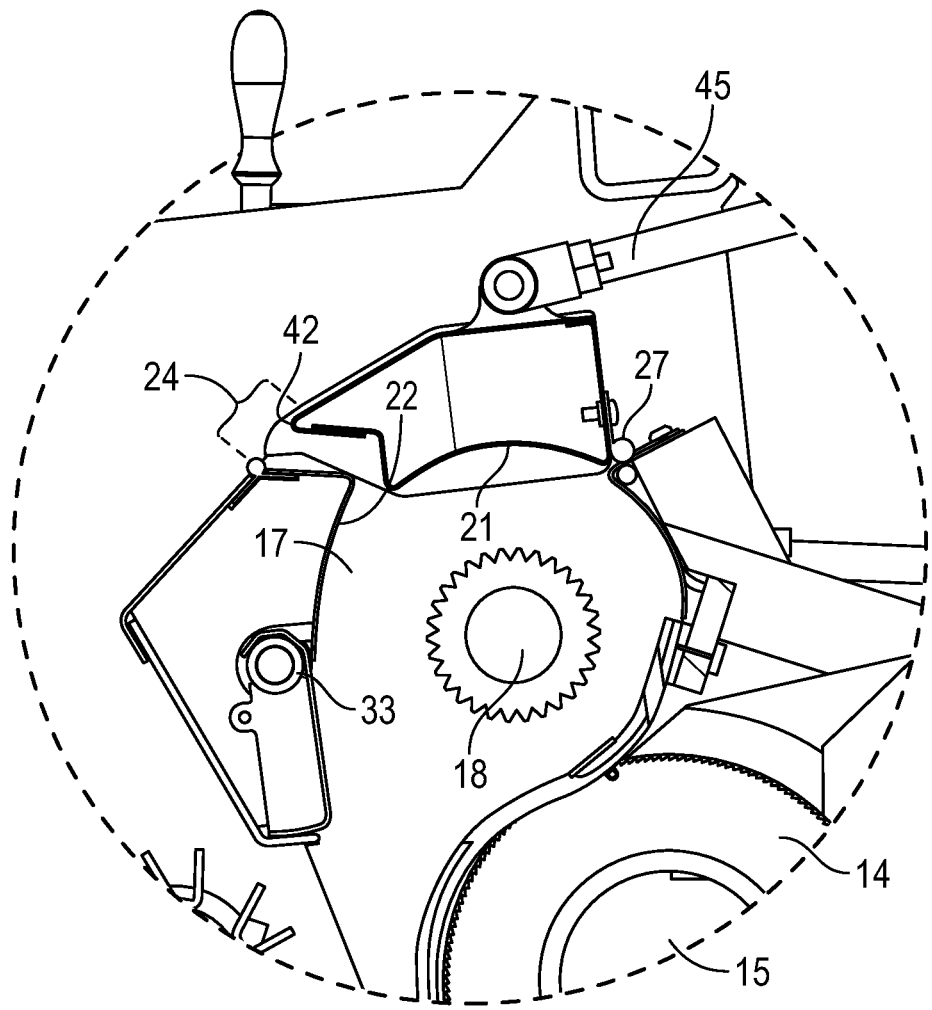
FIG. 12 is an enlarged view of FIG. 9 with the front and upper roll box doors closed.

As can be seen in FIG. 12, the top of the roll box area typically has an opening 24 where the seed roll can be observed when cotton is not being fed into the gin stand, or at the very least touched by the fingertips of an operator. In current high capacity gin stands, this opening is normally smaller than in generations past for multiple reasons. One of these reasons is to prevent the operator from being injured or able to reach any moving parts when the machine is in operation. Another reason is to streamline the path of the outer surface of the seed roll to reduce drag and increase throughput. The smaller opening on a modern gin stand makes visual observation of the seed roll impractical even when the flow of incoming seed-cotton is interrupted or diverted.

Figure 9:
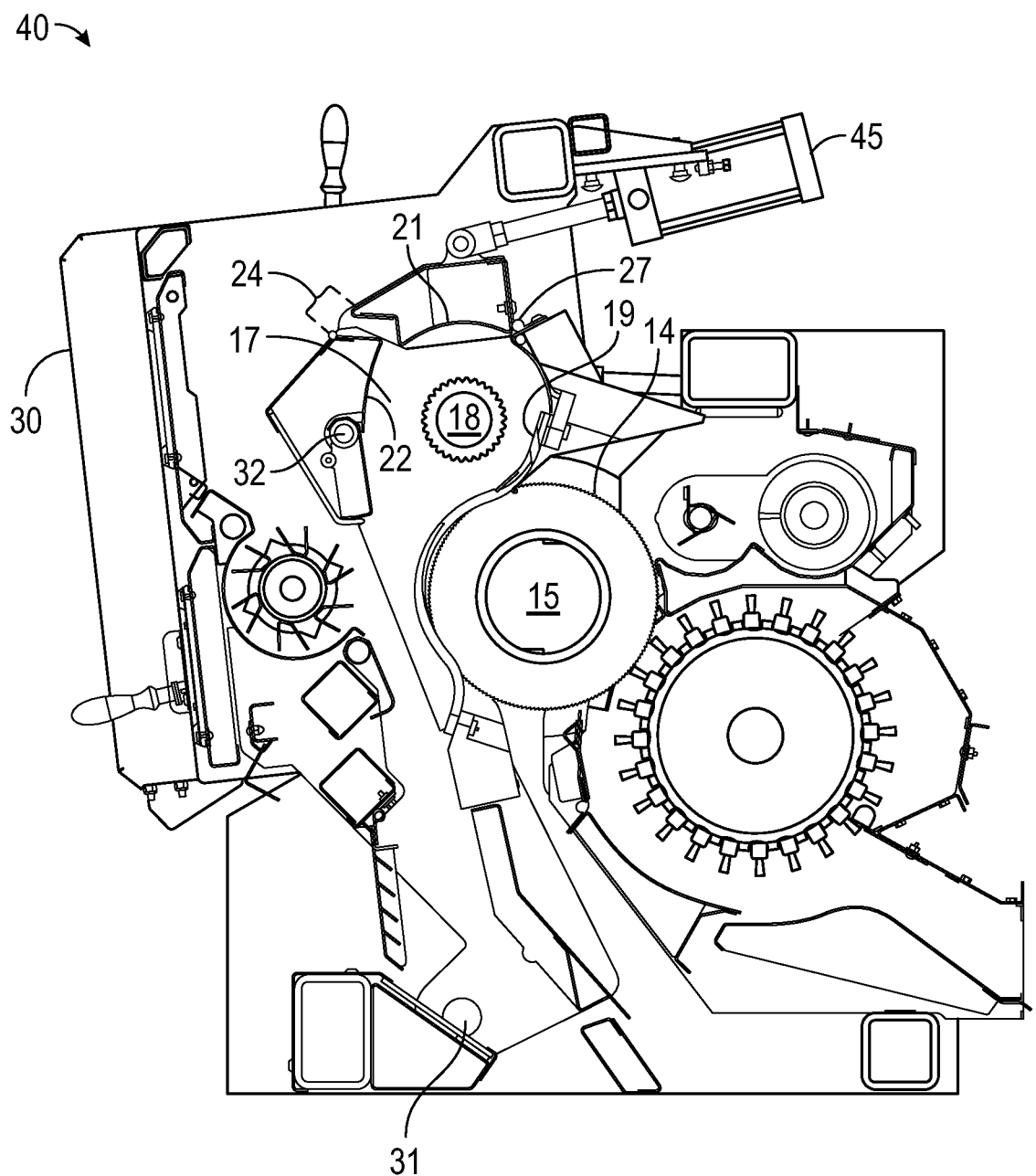
FIG. 9 is a side cross section view of FIG. 8 with the breast rotated out of the ginning position.
Figure 14:
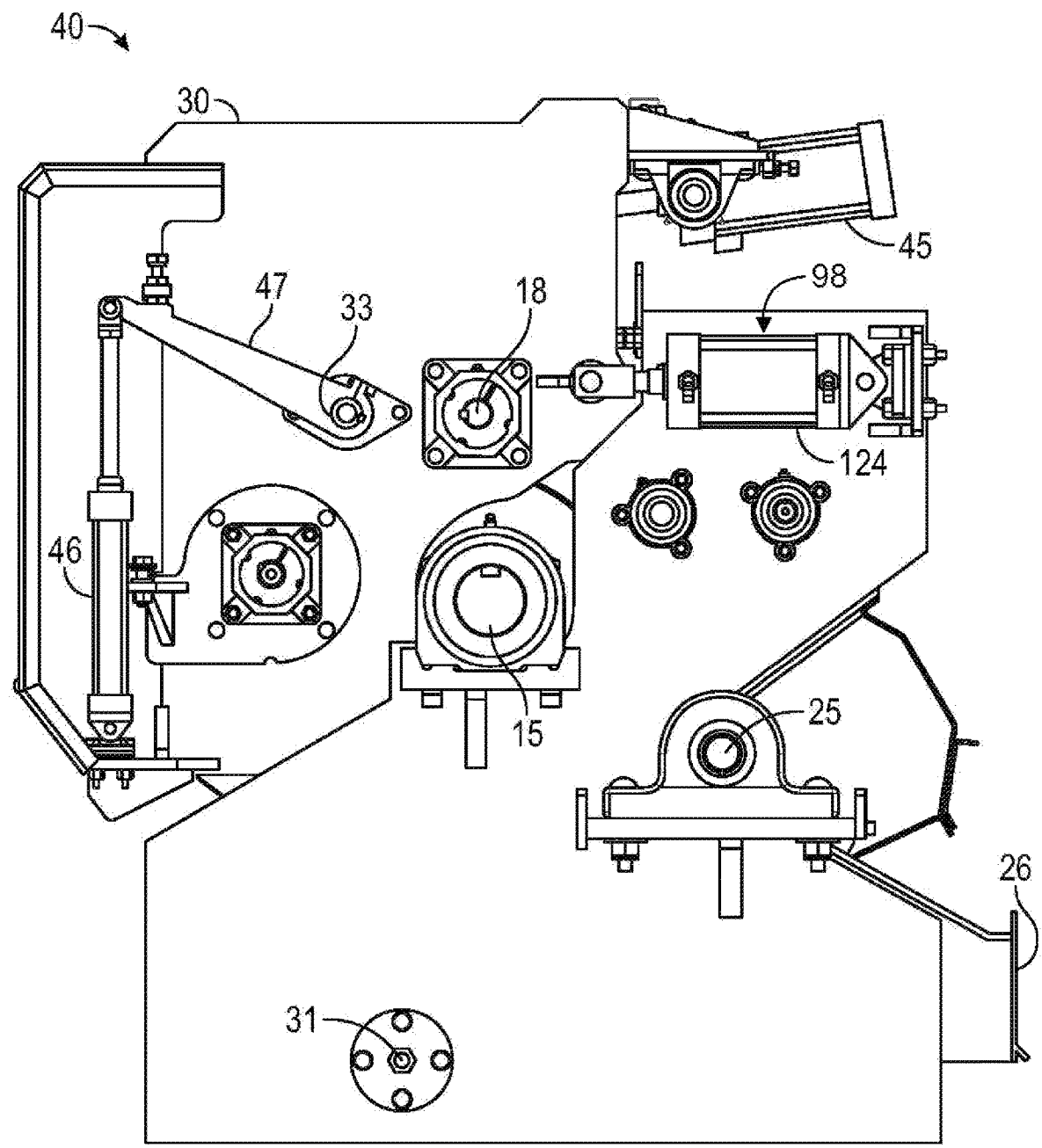
FIG. 14 is a side exterior view of the present invention from FIG. 8.
Figure 15:
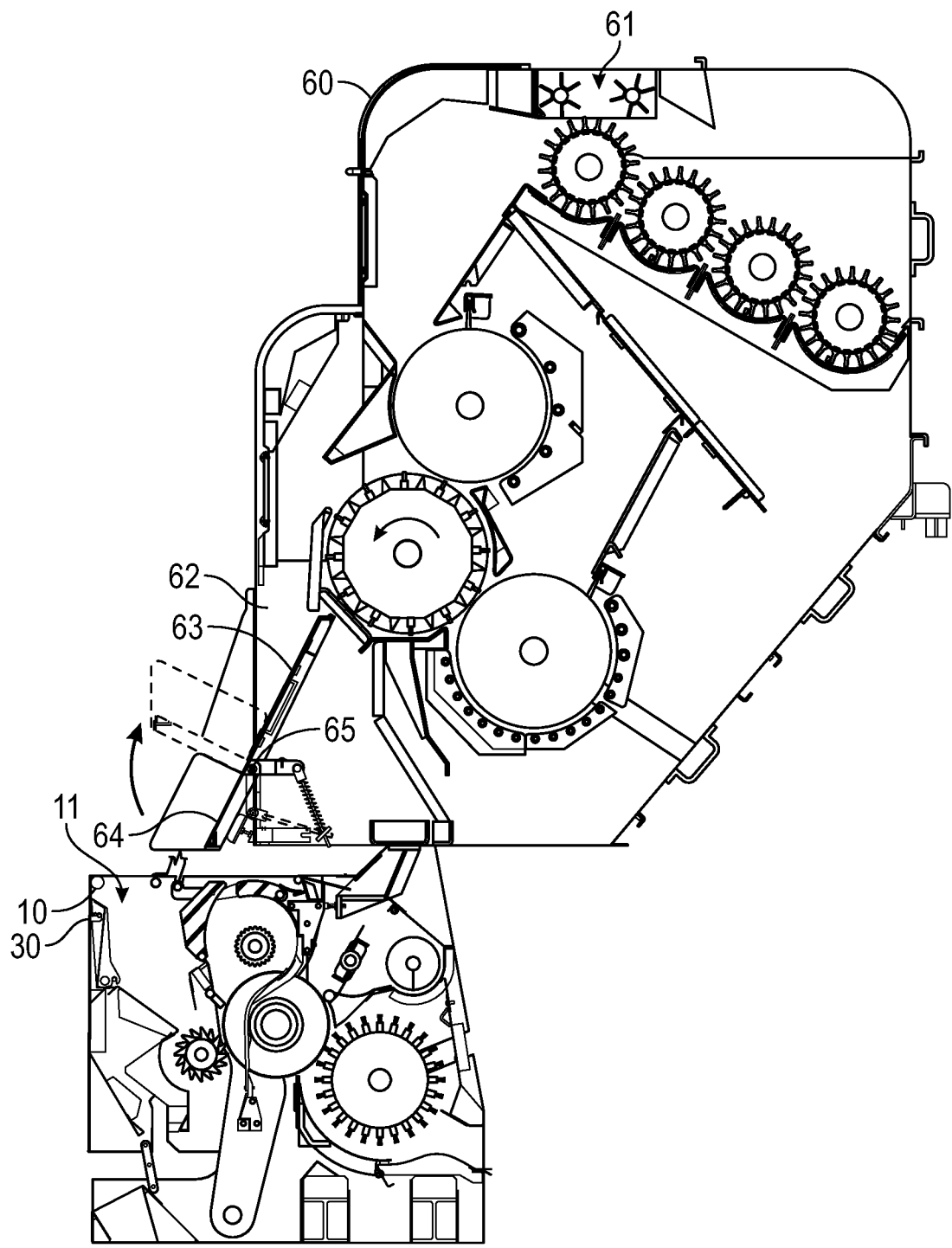
FIG. 15 is the FIG. 1 prior art gin stand section view with a section view of a prior art extractor feeder attached above.

As there are a large number of machines and systems in a cotton gin processing a highly variable agricultural product under a wide variety of conditions, it is not unusual for the feed of seed-cotton into the gin stand to be interrupted from time to time. While these interruptions are highly undesirable, and while they can be minimized, they cannot be eliminated altogether. As best seen in FIG. 9, when the feed stops, the gin stand breast 30 is pulled out (or rotated out about pivot point 31 by a gin breast moving device 98, which is exemplified by piston 124 as seen in FIG. 14) and the roll box 17 area (or roughly tubular-shaped cavity surrounding the oscillator cylinder 18) is pulled away from the saws 14 to halt the ginning process, thereby helping maintain the integrity and density of the seed roll, which is highly desirable for a number of operational reasons. It is in this state that the operator can best visually see the condition and touch the surface of the seed roll through the narrow opening 24. The gin breast moving device 98 may comprise an actuator that includes a piston, similar to pistons 45, 46 described herein. The gin breast moving device 98 may be coupled to a central controller 102, as will be described below in connection with FIG. 20

FIG. 12 shows a closer view of the narrow opening 24 from FIG. 9, where the breast 30 is moved out by the gin breast moving device 98 (See FIGS. 8-9), and with the upper and front roll box doors closed. The opening 24 in this configuration forms the entrance to a tunnel opening along the entire width of the roll box 17 area where the tunnel floor is defined by the top surface of the front roll box door 22, and the tunnel ceiling is defined by the forward-protruding portion 42 of the upper roll box door 21. Reference numeral 42 may also be characterized as denoting a nose of a longitudinal portion of the upper roll box door 21. At the rear of this tunnel, the path opens downward into the roll box 17 cavity, safely allowing only the fingertips of an operator to come into contact with the seed roll. It will be understood that the length of the forward-protruding portion 42 allows the depth of the tunnel to be designed in such a way as the hands of a normal operator cannot reach any moving parts inside the roll box when the doors are closed.

Figure 11:
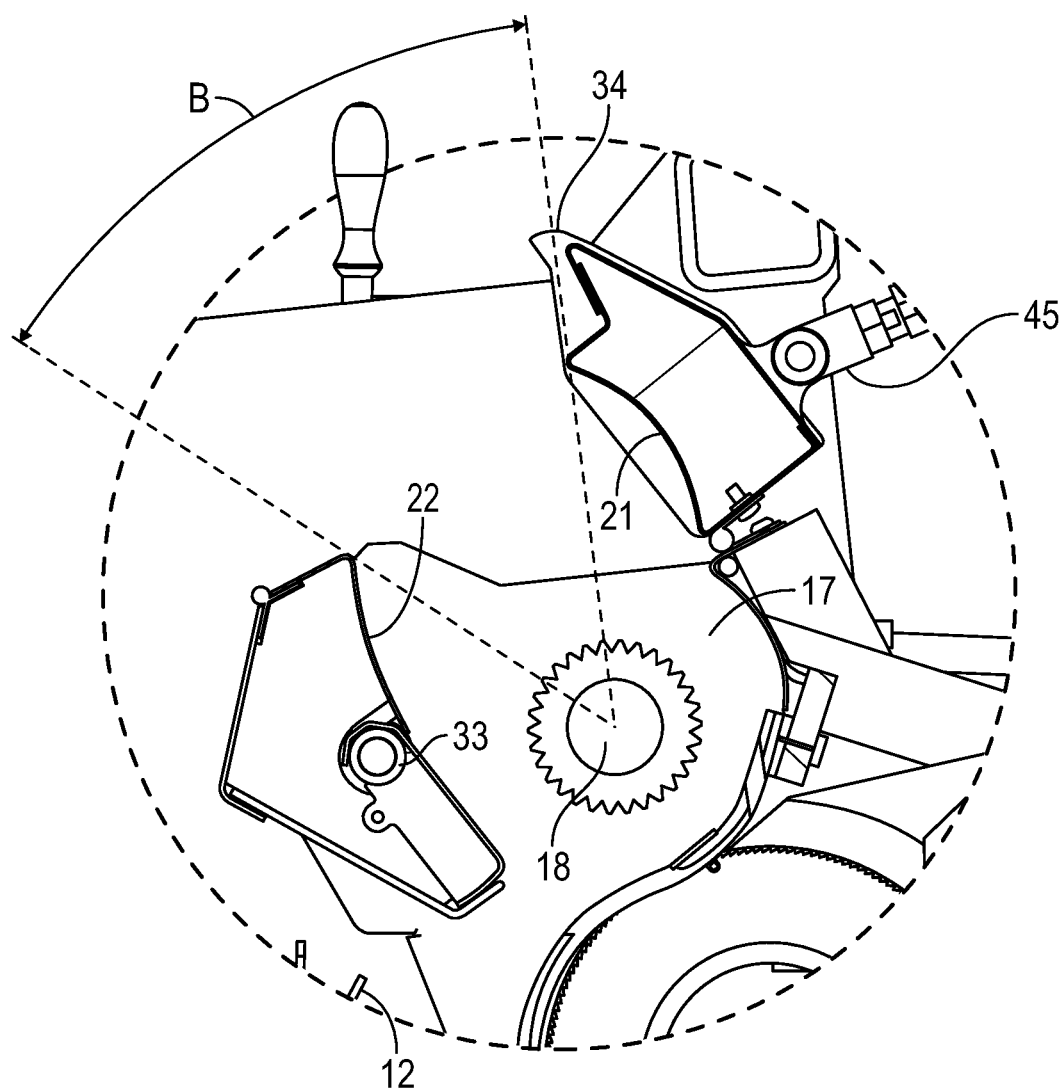
FIG. 11 is an enlarged view of FIG. 9 with the front and upper roll box doors open.

When the breast is rotated out and the spinning saws 14 are out of reach below the surface of the ribs, the operator can gain increased access to inspect the seed roll if the upper and front roll box doors 21, 22 are opened. It should be noted that some brands and models of gin stands 40 may have only one roll box door (an upper 22 or a front 21) instead of both an upper roll box door 22 and a front roll box door 21. Having both doors 21, 22 allows for greater access to view the seed roll, and when the seed roll is not present it allows for improved visibility of the ribs and access to all parts of the roll box area for maintenance. This difference in access can best be demonstrated as seen in FIG. 11 and FIG. 13.

Figure 13:
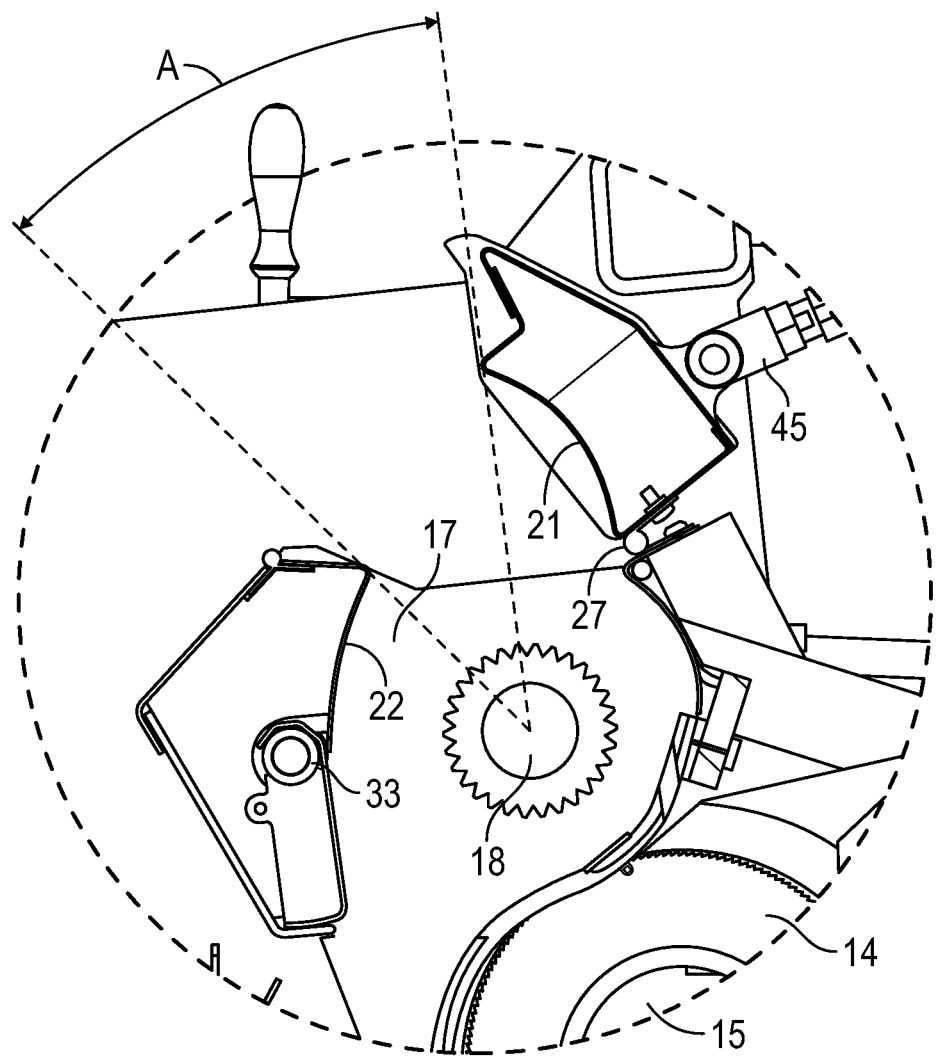
FIG. 13 is an enlarged view of FIG. 9 with the front roll box door closed and upper roll box door open.

As best seen in FIG. 13, where only an upper roll box door 21 is opened and the front roll box 22 door remains closed as if it were a stationary panel, angle A can be used to represent the degree of operator access to the oscillator cylinder 18 (and other parts inside the roll box 17 area). As best seen FIG. 11, both an upper roll box door 21 and a front roll box door 22 are opened to demonstrate a significantly greater degree of operator access as represented by angle B. It should also be noted that when comparing FIG. 13 to the PRIOR ART as seen in FIGS. 3-7, this particular combination wherein the upper roll box door 21 is opened without first having opened the front roll box door 22 was not possible in the prior art machine as the upper roll box door 21 includes a cap plate 34 at each extremity and, the upper roll box door 21 of the prior art is secured in the closed position by virtue of each cap plate 34 being trapped by the front roll box door 22.

Figure 10:
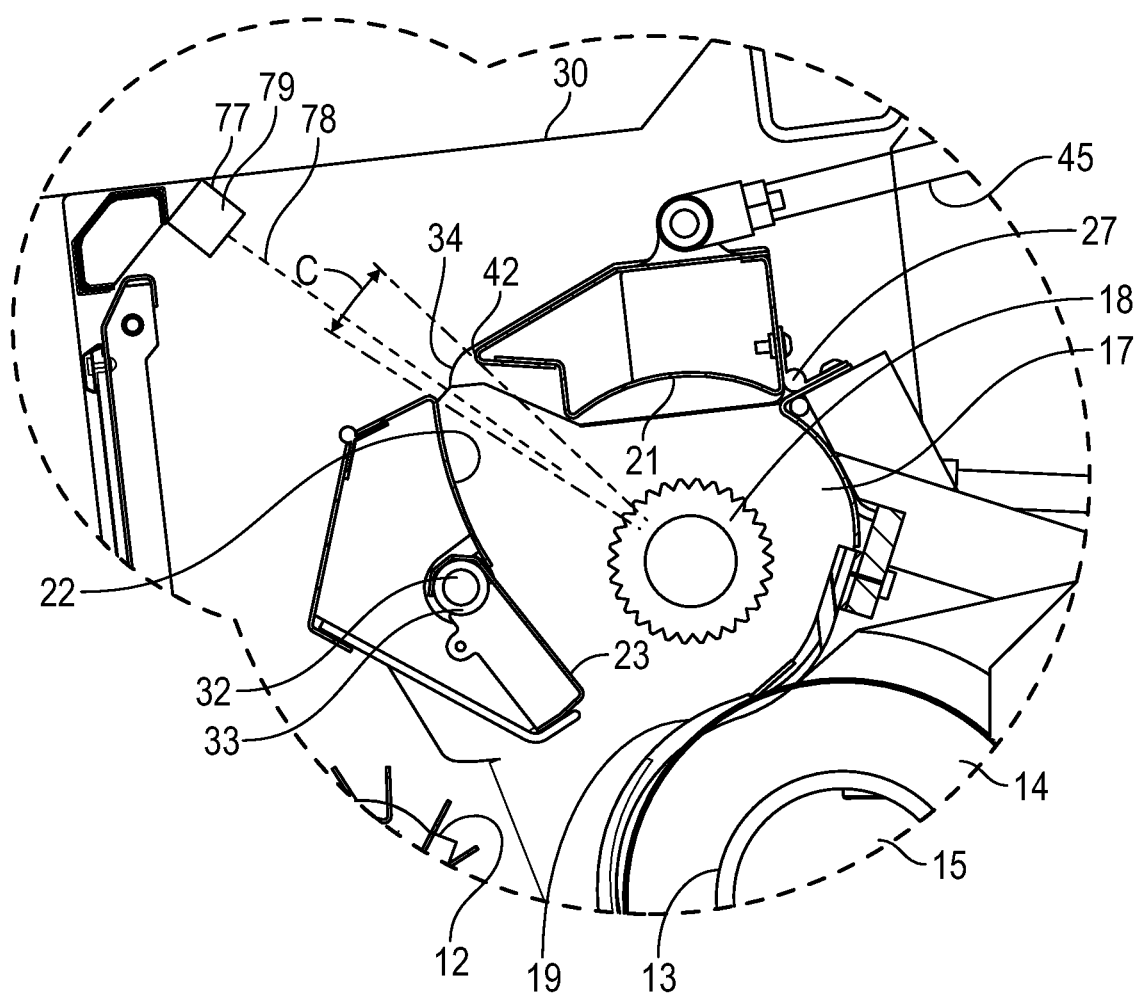
FIG. 10 is an enlarged view of FIG. 9 with the front roll box door open and the upper roll box door closed.

It should also be noted in FIG. 10 that when only the front roll box door 22 is opened and the upper roll box door 21 remains closed, the degree of operator access to the oscillator or the seed roll is very small as represented by angle C, and that it is further limited by virtue of the shape of the forward-protruding portion 42 of the upper roll box door 21.

Figure 16:
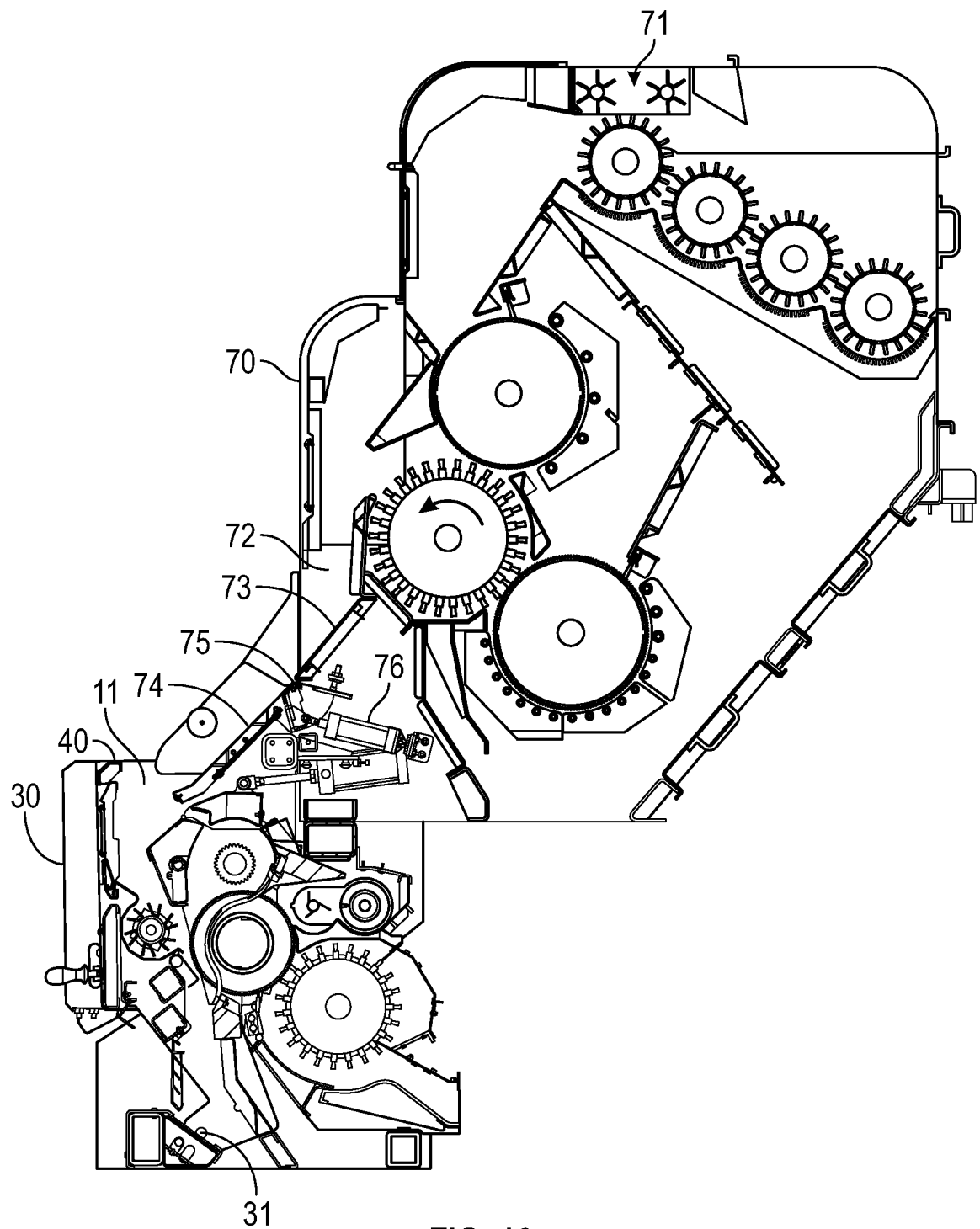
FIG. 16 illustrates a current invention gin stand section view with a section view of the present invention extractor feeder attached above.

As best seen in FIG. 16, the present invention gin stand 40 is fed cotton by an improved extractor feeder 70. Seed-cotton enters the extractor feeder 70 from a hopper above through the inlet 71 at a controlled rate, and exits the machine through the outlet 72, passing onto the upper feeder apron 73, and slides down onto the pivotably attached lower feeder apron 74 before becoming airborne and falling into the inlet 11 of the gin stand 40 directly below. The lower apron 74 is hinged about pivot point 75 and can be movably held in a position by piston 76 or similar linear actuating device or by other movable means.

Figure 17:
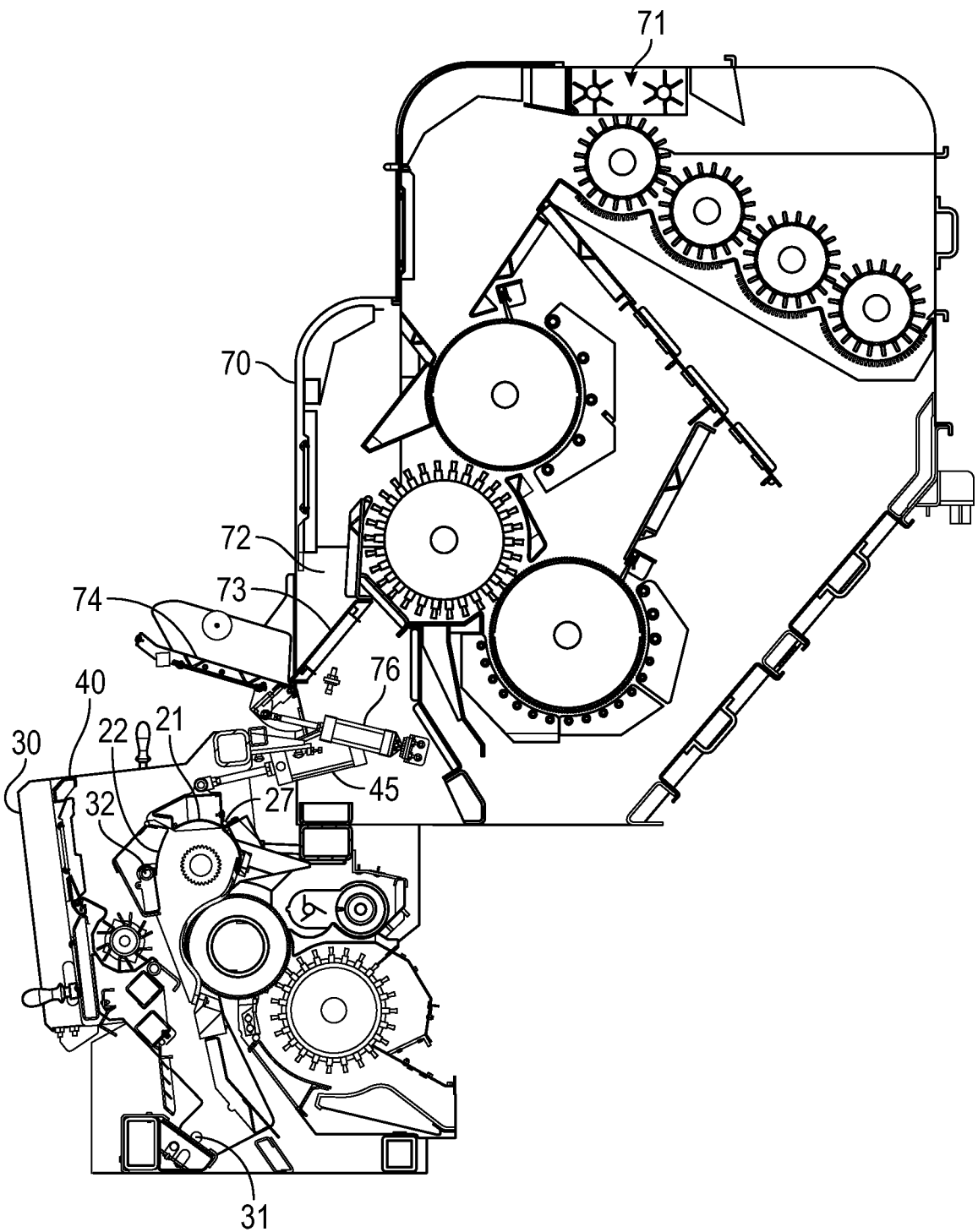
FIG. 17 illustrates an invention gin stand section view with breast out and a section view of the present invention extractor feeder attached above with lower apron raised.

In FIG. 16, the breast 30 is rotated into the ginning position and the lower feeder apron 74 is down in the ginning position. In FIG. 17, the breast 30 has been moved out of the ginning position and the lower feeder apron 74 has been raised. The upper and front roll box doors are closed in both figures.

Figure 18:
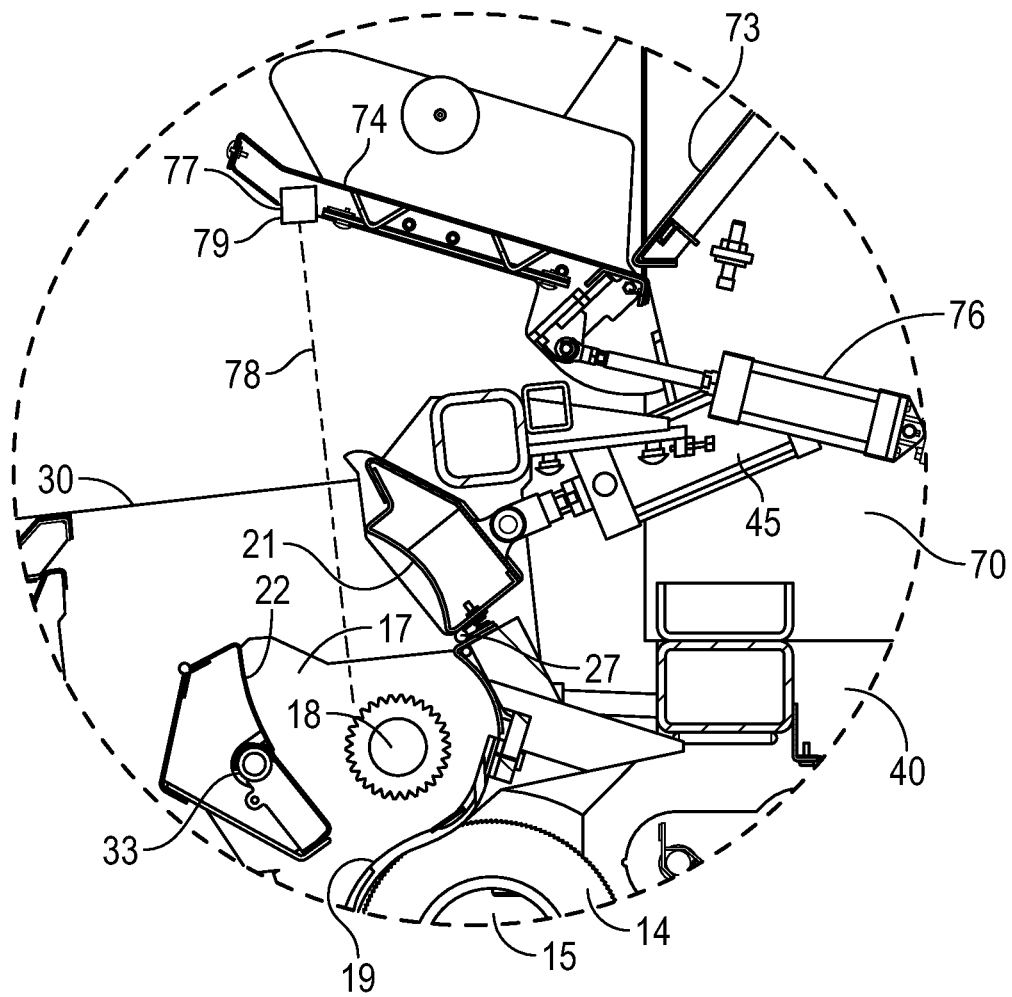
FIG. 18 is an enlarged view of the present invention gin stand section view with the front and upper roll box doors open, and with the extractor feeder attached above with lower apron raised.

As best shown in FIG. 18, a sensing device(s) 77 and/or camera(s) 79 may be mounted on the back side of the lower apron 74. In the normal course of operation, the operator may elect to inspect the seed roll by selecting this feature on the control panel, or through an automatic means the controls may elect to automatically inspect the seed roll at a predetermined interval of time or by other criteria.

When this inspection process is about to occur, the control system automatically stops the feed of seed-cotton, the lower apron 74 is raised by piston 76, the breast 30 is moved out of the ginning position, and the upper roll box door 21 and/or the front roll box door 22 can be opened to allow an operator or a sensing device(s) 77 and/or camera(s) 79 a line of sight 78 into the roll box 17 for inspection of the seed roll. It should also be noted that the device(s) 77 and/or camera(s) 79 may be movably mounted on a rail (or similar device) and powered to move along said rail to reduce the number or size of devices and/or cameras required and such variations are included within the scope of this disclosure as understood by one of ordinary skill in the art.

This inspection can include seeking high temperature spots along the length of the seed roll, areas of discoloration, variation in density, or other qualities. If the inspection is performed automatically by a sensing device(s) and/or camera(s), and no abnormalities are detected, then the controls can automatically close the roll box doors(s) 21, 22, move the breast 30 back into ginning position, lower the feeder apron 74, and resume the feed of seed-cotton into the gin stand 40 and record the results of the inspection along with the date and time and any other pertinent information.

It is important to note that the length of time and the laborious degree of effort required to accomplish this inspection is much greater with the prior art since the feeder apron 74 and roll box doors 21, 22 must be manipulated manually. High capacity commercial saw-type gin stands today are commonly available in eight, ten, and twelve-foot nominal widths, and the weight and difficulty of manually moving the lower apron and roll box doors commonly requires more than one operator to be involved in this process in order to accomplish these tasks quickly and safely. As a result, the operator may not be inclined to perform this inspection as often as conditions might warrant, thus increasing the risk of damage to equipment and increase in overall downtime.

If the inspection is performed automatically by a sensing device(s) 77 and/or camera(s) 79, and one or more abnormalities are detected, the controls or a central controller 102 may be preset to turn on an alarm 122 (see FIG. 20) to notify the operator and record the nature of the abnormality along with the date and time and any other pertinent information. If the abnormality will require the removal of the seed roll, the laborious task of breaking up the seed roll and allowing it to drop out of the bottom of the roll box 17 may be required and/or suggested by the central controller 102.

Figure 1:
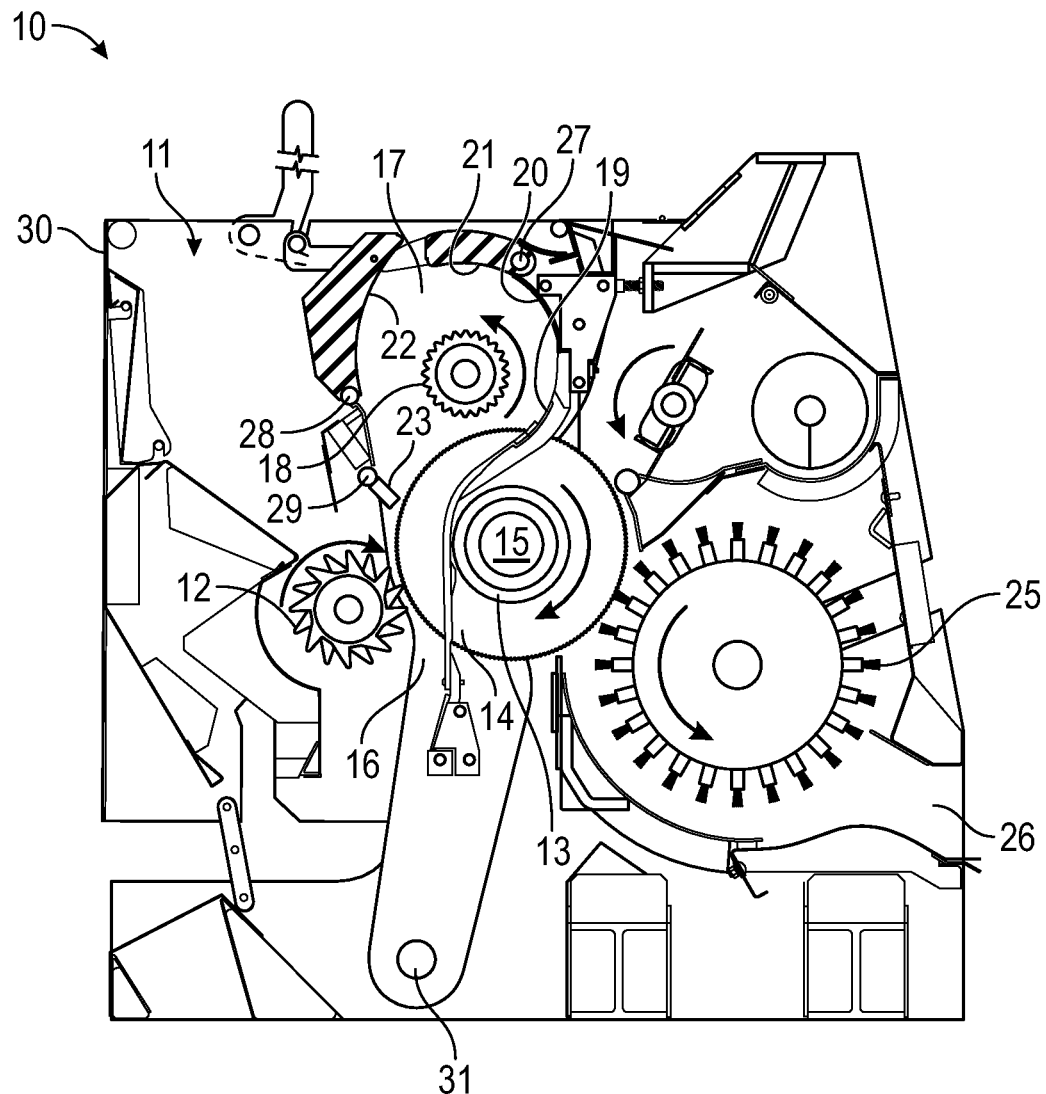
FIG. 1 is a side cross section view of a prior art gin stand with the breast in the ginning position.
Figure 2:
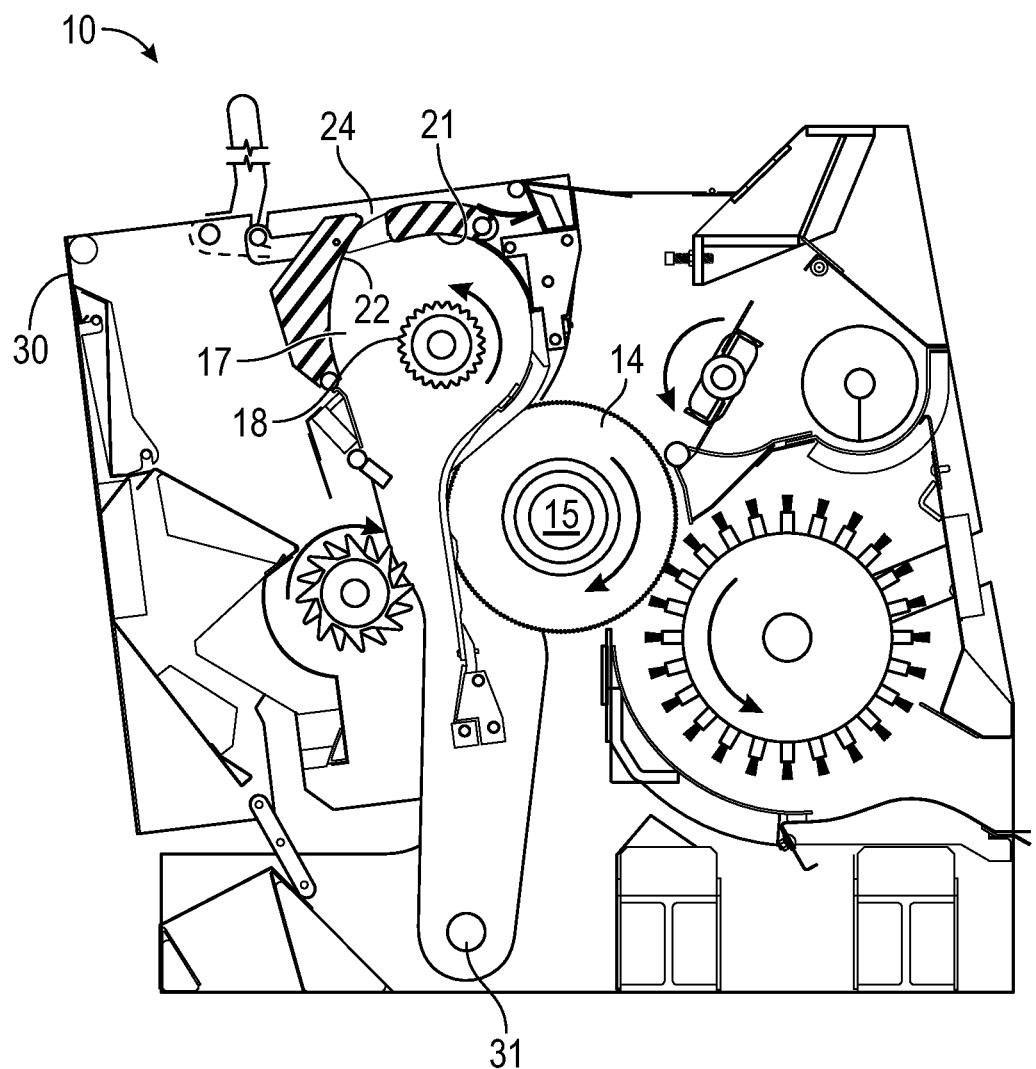
FIG. 2 is a side cross section of FIG. 1 with the breast rotated out of the ginning position.
Figure 3:
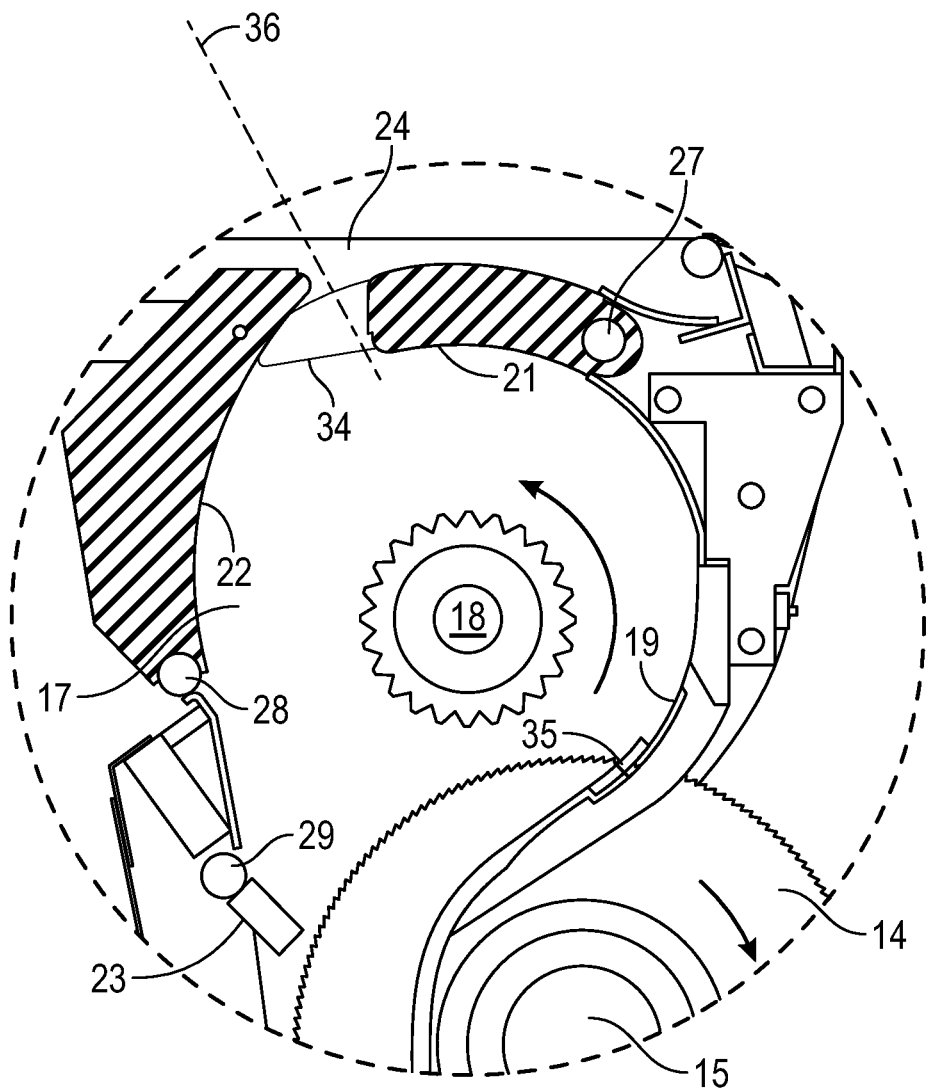
FIG. 3 is an enlarged view of FIG. 1 showing more of the details of the roll box area.
Figure 4:
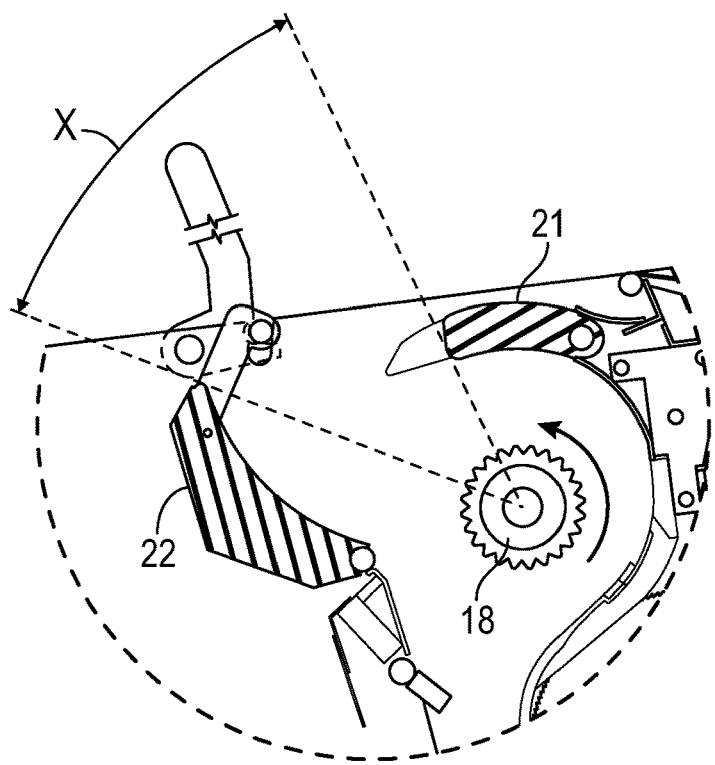
FIG. 4 is an enlarged view of FIG. 2 with the front roll box door open.
Figure 5:
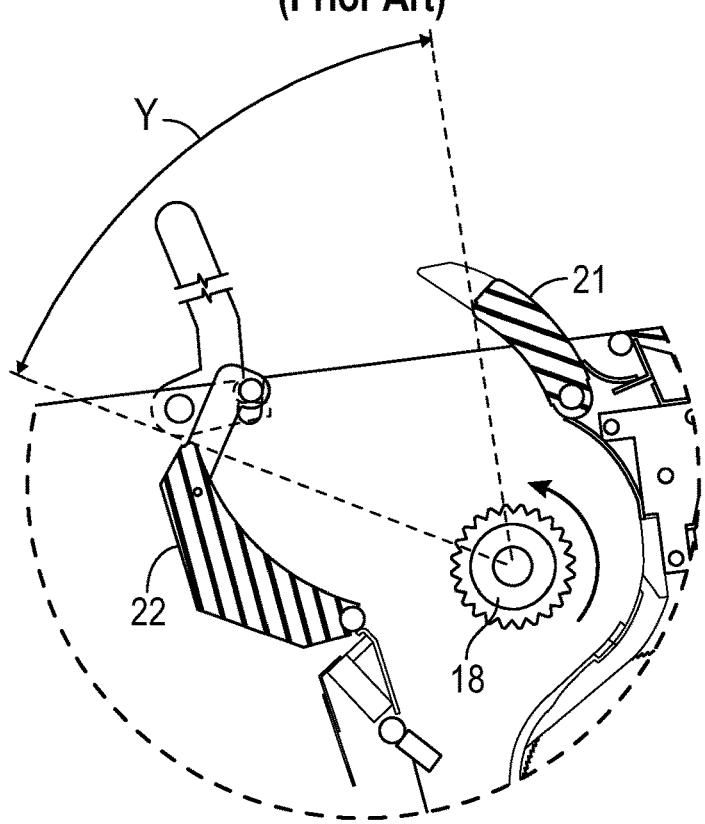
FIG. 5 is an enlarged view of FIG. 2 with the front and upper roll box doors open.
Figure 6:
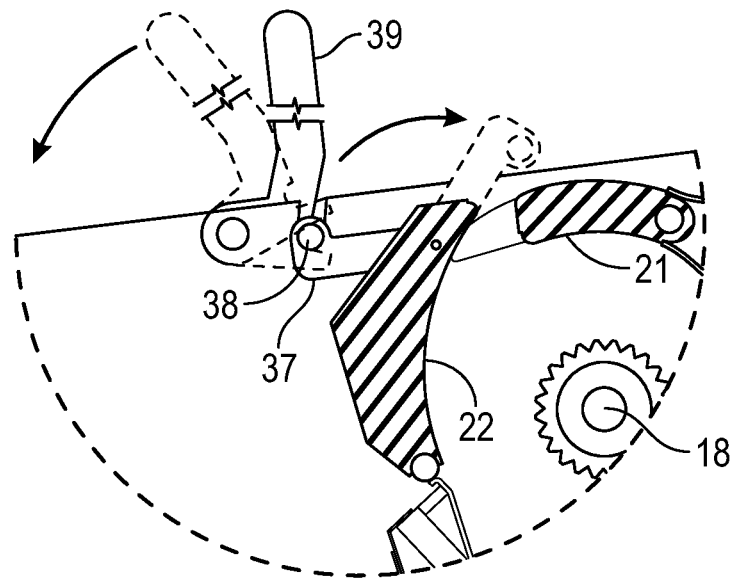
FIG. 6 is a view showing the locking mechanisms and the range motion for the upper and front roll box doors of a prior art gin stand.
Figure 7:
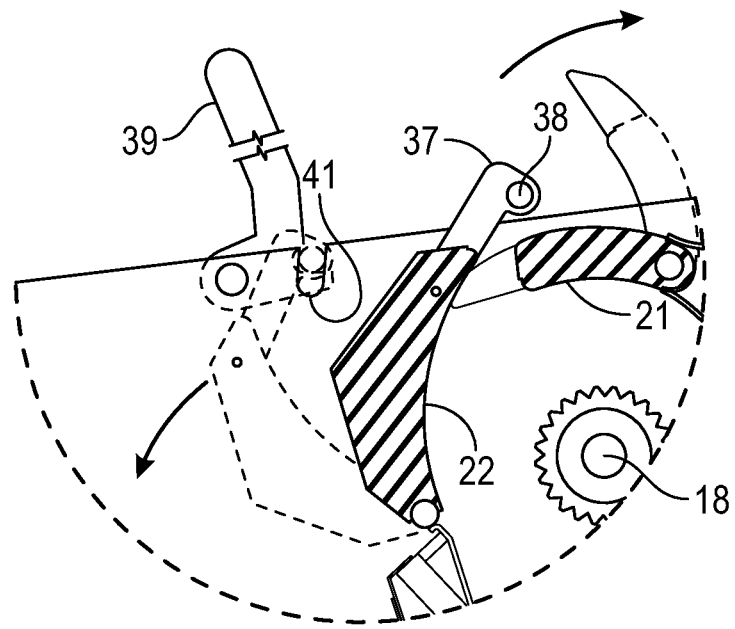
FIG. 7 is a view showing the locking mechanisms and the range motion for the upper and front roll box doors of a prior art gin stand.

In direct contrast to the prior art as seen in FIG. 3 where the hinge point 28 of the front roll box door 22 is located at the lower extremity of the door 22, the present invention as seen in FIG. 18 has a front roll box door 22 featuring a hinge 33 located somewhat near the middle of the inward face of the door. In addition and by virtue of the unique feature of having a piston actuator 46 as seen in FIG. 14 (or by other powered means), this door can now be oscillated back and forth under a powered means by a single operator selecting this action to take place on a control system display as an aid to breaking and removing the seed roll, reducing both the time and labor costs associated with the seed roll removal process. As noted previously, the piston actuator 46 may be coupled to a central controller 102, as will be described below in connection with FIG. 20.

Another unique feature of the present invention also by virtue of a piston actuator 46 as seen in FIG. 14 (or by other powered means), the front roll box door 22 can be used to aid in the estimation of the density of the seed roll. One method involves equipping the pneumatically-powered piston actuator 46 with at least two control devices (not illustrated); a linear position sensor that can determine when the piston (or any linear actuator) is at each normal extreme limit of the mechanical adjustments and at any point in between; and a transducer to measure or provide data from which to calculate the force being applied to lever arm 47 that is used to actuate the front roll box door 22.

As best seen in FIG. 10, it can be demonstrated that as the breast 30 is being moved out of the ginning position, the front roll box door 22 of the present invention can be opened when the upper roll box door 21 remains closed. As the seed roll will oppose the opening of the front roll box door, measurements of both the force being applied and distance travelled at a point during the door opening process prior to reaching the mechanical limits when fully open, readings can be taken from these devices and the control system can automatically estimate the relative density of the seed roll. It will be understood by those familiar in the art that the means of: actuating the front roll box door 22, measuring its change in position, and force being applied can vary from the methods being described herein and still be accomplished within the spirit of this disclosure as understood by one of ordinary skill in the art.

As best seen in FIG. 10 it can also be demonstrated that when the breast 30 is being moved out of the ginning position with the gin breast moving device 98, the front roll box door 22 of the present invention can be opened when the upper roll box door 21 remains closed, and when the font roll box door 22 is opened this can provide a line of sight 78 for a sensing device(s) 77 and/or camera(s) 79 for inspection of the seed roll. This inspection can include seeking high temperature spots along the length of the seed roll, areas of discoloration, variation in density, or other qualities. The device(s) 77 and/or camera(s) 79 may be mounted inside the breast 30, and outside of the path of the seed-cotton being fed into the gin stand.

Alternatively, the device(s) 77 and/or camera(s) 79 could also be mounted outside of the breast or could be mounted to another object in such a way as to not be attached to the breast and still accomplish the same task. It should also be noted that the device(s) 77 and/or camera(s) 79 may be movably mounted on a rail (or similar device) and powered to move along said rail to reduce the number or size of devices and/or cameras required and remain within the spirit of the process described herein.

The one or more cameras 79, 82 described above may comprise a digital camera. Each digital camera 79, 82 may comprise a charge-coupled device (CCD) camera or a complementary metal-oxide semiconductor (CMOS) camera, as understood by one of ordinary skill in the art. The one or more cameras 79, 82 may have hardware and/or software for supporting machine vision algorithms.

Each sensor 77, 81 may comprise one or more measurement devices. Exemplary measurement devices include, but are not limited to, thermal or temperature sensors, infrared thermometers, pressure transducers, thermal image sensors that may form part of the cameras 79, 82, moisture measuring sensors, hygrometers, acoustic/sound detectors, gas detectors, displacement sensors, laser rangefinders, accelerometers, ultrasonic thickness gauges, electro-optical sensors, flame detectors, optical position sensors, force gauges, force sensors, and piezoelectric sensors just to name a few. Anyone of these measurement devices may be used alone or combined to form the one or more sensors 77, 81 which measure the physical properties of the seed roll described above and/or measure the parts of the gin stand 40 which handle and/or help form/produce the seed roll.

Figure 20:
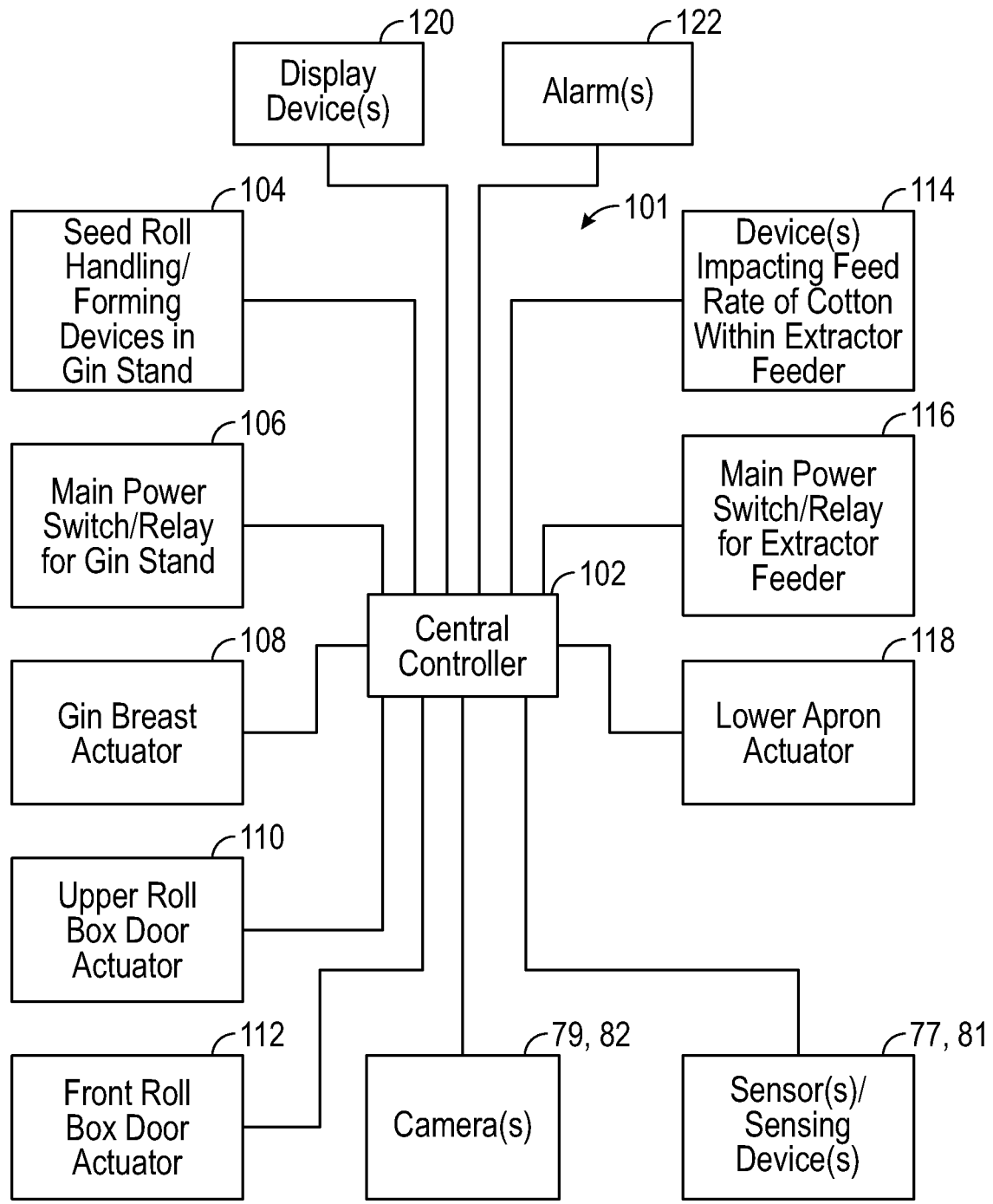
FIG. 20 is a functional block diagram of a central controller according to one exemplary embodiment.

Referring briefly to FIG. 20, this figure illustrates an exemplary control system 101 for the improved gin stand 40 and extractor feeder 70. The control system 101 may comprise a central controller 102. The central controller 102 may be coupled to anyone of the seed roll handling/forming devices 104 or any device within the gin stand 40. The central controller 102 may be coupled to a main power switch/relay for the gin stand 40 in order to stop power which in turn stops production and movement of the seed roll for inspection as described above.

The central controller 102 may also be coupled to a gin breast actuator 108, an upper roll box door actuator 110, and a front roll box door actuator 112. The gin breast actuator 108 may include the gin breast moving device 98 illustrated in FIGS. 8-9. The gin breast moving device 98 may include a piston 124. A piston may be hydraulic, pneumatic, and/or electromechanical in nature. An "actuator" may include any one or a number of different moving devices, such as the pistons described above, as well as, gears, belts, pulleys, rods, arms, etc. as understood by one of ordinary skill in the art. Each of these moving devices may have sub-controllers and/or programmable logic, such as a central processing unit (CPU) or other hard-wired circuitry which is coupled via a communication line to the central controller 102.

Similar to the gin breast actuator 108, the upper roll box door actuator 110 and front roll box door actuator 112 may include the pistons 45, 46 described above. The central controller 102 may activate the gin breast actuator 108, the upper roll box door actuator 110, and/or the front roll box door actuator 112 serially or in parallel when a seed roll inspection is needed. Simultaneous, or near simultaneously, the central controller 102 may send a signal to the main power switch/relay 106 to stop production and/or movement of the seed roll for the inspection as described above.

The central controller 102 may also be coupled to the one or more cameras 79 and/or the one or more sensors 77 which may be used for the seed roll inspection. While not illustrated, the central controller 102 may also comprise a storage device, such as memory, for storing readings made by the cameras 79 and sensors 77. The central controller 102, via the cameras 79 and/or sensors may assess the physical properties of the seed roll, which include, but are not limited to, high temperature spots along the length of the seed roll, areas of discoloration, relative density of the seed roll, variation in density, and/or other qualities.

As noted previously, the central controller 102 may also be coupled to sensors 77 that measure changes in position of the roll box doors 21, 22 as well as what magnitude of forces are applied to the actuators to open/move the roll box doors 21, 22 to the open position. Such parameters may be used by the central controller to assess a quality of the seed roll being formed around the agitator 18.

The central controller 102 may also be coupled to one or more devices 114 of the extractor feeder 70 that impact the feed rate of cotton within the extractor feeder 70. The central controller 102 may be coupled to the main power switch/relay 116 of the extractor feeder 70. Similar to the main power switch/relay 116 of the gin stand 40, the central controller 102 may power down and/or reduce the speed of the extractor feeder 70 when a seed roll inspection is to be made.

The central controller 102 also may be coupled to a lower apron actuator 118. The lower apron actuator 118 may include the piston 76 for the lower apron 74 as illustrated in FIG. 18. The central controller 102 may control the piston 76 for raising the lower apron 74 and it may also activate the camera 79 and/or sensor 77 positioned on the lower apron 74 as illustrated in FIG. 18 in order to assess the seed roll being formed within the gin stand 40.

As mentioned above, after the central controller 102 assesses a quality and/or property of the seed roll being formed, such as but not limited to the surface velocity of the seed roll and/or detecting changes in surface velocity of the seed roll, the central controller 102 may make adjustments to anyone of the devices present within the gin stand 40 and the feeder extractor 70. For example, as one nonlimiting example, after assessing a seed roll within gin stand 40, the central controller 102 may increase or decrease speeds of the agitator 18, picker roller 12, gin saw cylinder 13, counter rotating brush cylinder 25. Similarly, the central controller 102 may increase or decrease speeds of devices within the feeder extractor 70, such as, but not limited to, any of those illustrated in FIG. 16.

The central controller 102 may record the results of a seed roll inspection along with the date and time and any other pertinent information found during an inspection. The central controller 102 may store these results in a local storage device, such as local memory, and/or the controller 102 may relay these results via a wired or wireless communications link to another device, such as a computer server coupled to the Internet, or a portable computing device (PCD), such as mobile phone of a gin stand operator.

The central controller 102 may display the results of a seed roll inspection on a display device 120. This display device 120 may be remote relative to the gin stand 40. The display device 120 may comprise a touch screen display or other similar display device such as liquid crystal display (LCD).

As described above, the central controller 102 may be coupled to one or more alarms 122. If a seed roll inspection is performed automatically by the controller 102 using the sensing device(s) 77 and/or camera(s) 79, and one or more abnormalities are detected, the central controller 102 may turn on one or more alarms 122 to notify the operator and record the nature of the abnormality along with the date and time and any other pertinent information.

Each alarm 122 may comprise an audible and/or visual type of alarm, or combination thereof. If a seed roll abnormality detected by the controller 102 will require the removal of the seed roll, the laborious task of breaking up the seed roll and allowing it to drop out of the bottom of the roll box 17 may be required and/or recommended by the central controller 102 by presenting such a message on the display device 120. The alarm condition may also be presented on the display device 120 as needed in addition to any separate alarms 122 such as warning lights and/or audible speakers for generating audible warning sounds.

According to another exemplary embodiment, if the seed roll inspection is performed automatically by the controller 102 using the sensing device(s) 77 and/or camera(s) 79, and one or more abnormalities are detected, the central controller 102 may, in addition to turning on one or more alarms 122, also recommend than an automated "purge cycle" be selected/activated to aid in the removal of the seed roll. As understood by one of ordinary skill in the art, the motors for the oscillator cylinder (also referred to as an "agitator") 18 may have variable speed drives, and the direction of for the rotation of the agitator 18 can also be reversed. The central controller 102 may display an option for selecting a purge cycle on the display device 120.

If the purge cycle is selected on the display device 120, the central controller 102 may make sure that the gin breast stand 30 is out/extended, and that the front roll box door 22 opens and closes a few times, while the controller 102 sends signals to instruct the agitator 18 to slowly spin in one direction a couple of revolutions (with the doors 21, 22 closed), and then stops the agitator 18. The central controller 102 may then issue commands to cause the agitator 18 to slowly spin in an opposite direction a few times, stops, and then the central controller 102 may then open both doors 21, 22 (or some similar combination which may be optimized through testing).

The central controller 102 may be any suitable device or a combination of devices that are configured to perform the functions of controllers discussed herein. For example, the central controller 102 of FIG. 20 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

Additionally or alternatively, the controller 102 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc.

A method for the control system to use in determining the relative density of the seed roll by measuring the energy required to turn the oscillator (or agitator) cylinder 18 was provided in describing the prior art above, and indeed this same methodology can be used in the present invention. In turn, the control system 101 uses this information to regulate the feed rate of seed cotton into the gin stand 40. Due to the tremendous number of variables previously described, finding an additional methodology to compare against in determining the relative density of the seed roll is very desirable in order to fine-tune the feed rate to meet the conditions present at any one moment in time.

Due to the unique features inherent in the front roll box door actuation in the present invention, and the capability for determining the relative density of the seed roll through additional methods, an automatic shift or adjustment can be made to the feed rate calculation so that the immediate conditions can be taken into account in order to reach an optimal feed rate to maximize the lint removal without reaching the practical limits of any of the drive components or causing damage to the gin stand or the seed-cotton.

Figure 19:
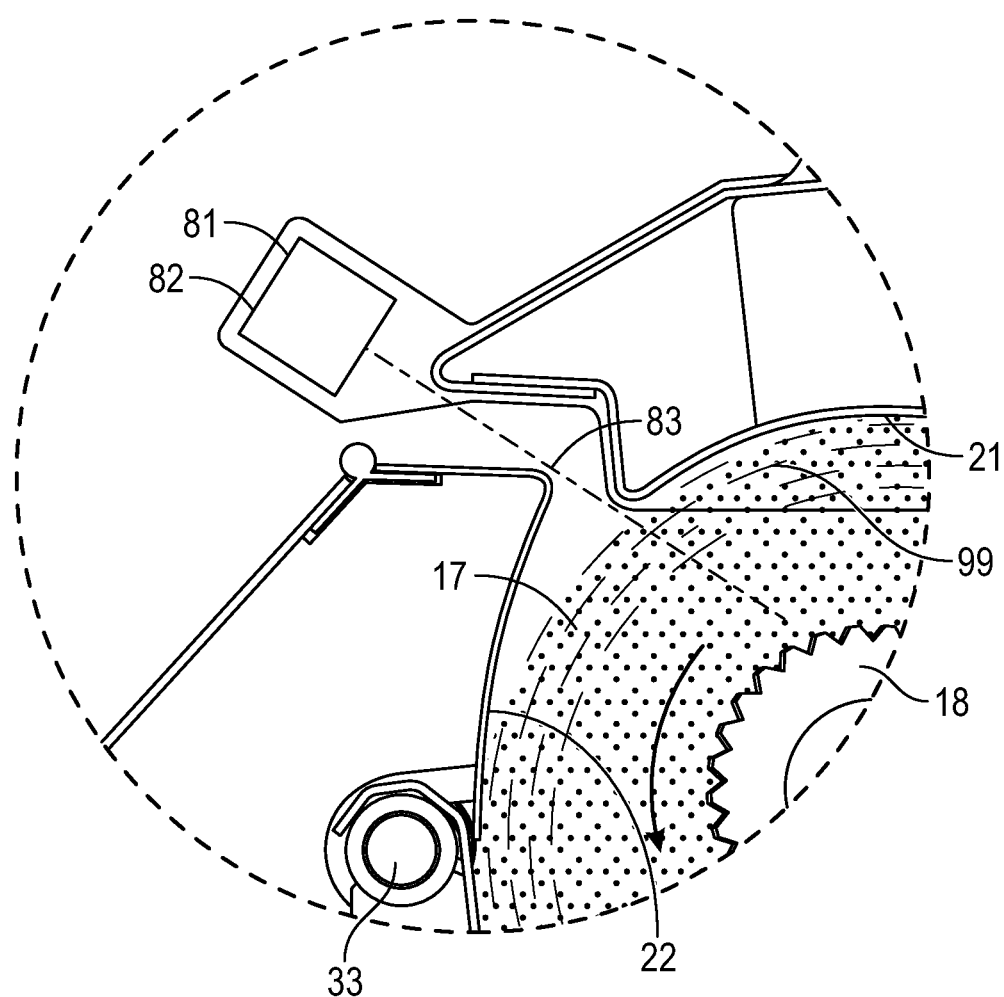
FIG. 19 is an enlarged view of FIG. 12 with the front and upper roll box doors closed.

As best seen in FIG. 19 it can be demonstrated that when the breast 30 (see FIG. 16) is in the ginning position and both the upper roll box door 21 and the front roll box door 21 are closed and ginning is taking place and seed-cotton is being fed into the gin stand 40, a sensing device(s) 81 and/or camera(s) 82 may be mounted on the upper roll box door with a line of sight 83 directly into the roll box 17 to inspect the seed roll. This inspection can include measuring the surface velocity, seeking high temperature spots along the length of the seed roll 99, areas of discoloration, variation in density, or other qualities. The seed roll 99 is illustrated in this exemplary embodiment of FIG. 19.

A unique feature of the present invention includes the ability for the control system 101 to monitor the surface velocity of the seed roll 99 and look for a change in surface velocity, which can in turn be used as an additional or early indicator that the feed rate of seed cotton needs to be reduced in order to prevent reaching the practical limits or trip settings of any of the drive components or causing damage to the gin stand or the seed-cotton.

If a trip setting is reached based for example on the amperage of a motor (not illustrated) that is coupled to the oscillator (or agitator) 18, or on the amperage of the saw motor (not illustrated) coupled to the gin saw cylinder 13, the normal result for practically all modern gin stand controls is that feed of seed-cotton will be stopped and the breast will automatically pull away from the ginning position. If the ramp up in energy required happens too rapidly, sometimes the machine will choke and the motor will stall before the controls can react to pull the breast out. This will stop ginning productivity altogether until the operator resolves the issue.

With the process of the current inventive system, this early warning of a reduction in velocity of the seed roll 99 can prevent the ginning from stopping completely and simply slow or interrupt the feed of seed-cotton until such time as the velocity increases again and record the results of the inspection and interruption of feed along with the duration, date and time, and any other pertinent information. It is important to note that the length of time and the laborious degree of effort required to unchoke a gin stand is much greater with the prior art than what little production is lost by temporarily reducing or stopping the feed of seed-cotton in an effort to prevent the breast from pulling out of the ginning position.

The variation or decrease in surface velocity of the seed roll 99 as determined by the sensing device(s) 81 and/or camera(s) 82 can also be used as a determining factor by the control system to automatically vary the speed, or revolutions per minute of the oscillator (or agitator) cylinder drive 18. It is also understood the automatic adjustments that can be made by the control system based on the indicated surface speed of the seed roll are not limited to the feed rate of seed cotton into the gin stand and the speed of the oscillator (or agitator) cylinder.

Alternatively, the sensing device(s) 81 and/or camera(s) 82 can also be mounted outside of the breast or can be mounted to another object in such a way as to not be attached to the upper roll box door 21 and still accomplish the same task. It is also understood that the sensing device(s) 81 and/or camera(s) 82 can also be used to seek hot spots on the surface of the seed roll 99 or variations in density that can be indicative of a tag or increased potential for a fire. It should also be noted that the sensing device(s) 81 and/or camera(s) 82 may be movably mounted on a rail (or similar device) and powered to move along said rail to reduce the number or size of devices and/or cameras required and remain within the spirit and scope of this disclosure as understood by one of ordinary skill in the art.

Based on this disclosure, one of ordinary skill in the art of programming is able to write computer code or identify appropriate hardware and/or circuits to implement the disclosed invention without difficulty based on the figures and description presented above.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features. Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above. Rather the scope of the invention is defined by the appended claims.

What is claimed is:

1. A gin stand (40) comprising:
a breast structure (30); and
a roll box (17) coupled to the breast structure, the roll box (17) comprising:
  a front roll box door (22);
  an upper roll box door (21); and
  an agitator cylinder (18) positioned within a central region of the roll box;
a first device (46) for opening the front roll box door;
a second device (45) for opening the upper roll box door; and
a central controller (102) coupled to the first and second devices, the central controller automatically controlling the first and second devices to open the front roll box door and the upper roll box door at a predetermined time for inspecting a seed roll (99) forming around the agitator cylinder.

2. The gin stand of claim 1, further comprising a camera (79) for recording an image of the seed roll.

3. The gin stand of claim 1, further comprising a sensor (77), the sensor detecting at least one of a surface velocity of the seed roll, a temperature of at least one portion of the seed roll, a color of at least one portion of the seed roll, and a density of at least one portion of the seed roll.

4. The gin stand of claim 1, further comprising a seed roll monitoring device (77/79), the seed roll monitoring device comprising at least one of a camera and a sensor for detecting a physical property of the seed roll.

5. The gin stand of claim 4, wherein the seed roll monitoring device is coupled to the breast structure.

6. The gin stand of claim 4, wherein the seed roll monitoring device is coupled to the upper roll box door.

7. The gin stand of claim 1, further comprising a third device (98) for moving the breast structure.

8. The gin stand of claim 7, wherein the third device is controlled by the central controller.

9. A system for processing seed-cotton, the system comprising a gin stand (40), the gin stand comprising:
a breast structure (30);
a roll box (17) coupled to the breast structure, the roll box (17) comprising:
  a front roll box door (22);
  an upper roll box door (21); and
  an agitator cylinder (18) positioned within a central region of the roll box;
first means (46) for opening the front roll box door;
second means (45) for opening the upper roll box door; and
a central controller (102) coupled to the first and second means for opening, the central controller automatically controlling the first and second means to open the front roll box door and the upper roll box door at a predetermined time for inspecting a seed roll forming around the agitator cylinder.

10. The system of claim 9, further comprising an extractor feeder (70) for feeding seed-cotton into the gin stand.

11. The system of claim 10, further comprising means (76) for lifting a lower apron (74) away from a ginning position, the means for lifting being coupled to the central controller.

12. The system of claim 9, further comprising a seed roll monitoring device (77/79), the seed roll monitoring device comprising at least one of a camera and a sensor for detecting a physical property of the seed roll.

13. The system of claim 12, further comprising a lower apron (74), wherein the seed roll monitoring device is coupled to the lower apron (74).

14. The system of claim 9, further comprising a camera (79) for recording one or more images of the seed roll.

15. The system of claim 9, further comprising a sensor (77), the sensor detecting at least one of a surface velocity of the seed roll, a temperature of at least one portion of the seed roll, a color of at least one portion of the seed roll, and a density of at least one portion of the seed roll.

16. The system of claim 9, further comprising means (98) for moving the breast structure.

17. The system of claim 16, wherein both of the first means for (46) opening and the second means for (45) is are controlled by the central controller.

18. A gin stand comprising:
a breast structure (30);
a roll box (17) coupled to the breast structure, the roll box (17) comprising:
  a front roll box door (22);
  a hinge pin positioned within a central region of the front roll box door and supporting the front roll box door, the front roll box door being pivotable around the hinge pin;
  an upper roll box door (21); and an agitator cylinder (18) positioned within a central region of the roll box;

a first device (46) for opening the front roll box door such that it rotates around the hinge pin when opened;

a second device (45) for opening the upper roll box door; and a central controller (102) coupled to the first and second devices, the central controller automatically controlling the first and second devices to open the front roll box door and the upper roll box door at a predetermined time for inspecting a seed roll forming around the agitator cylinder.

19. The gin stand of claim 18, further comprising a camera (79) for recording at least one image of a seed roll being processed by the gin stand.

20. The gin stand of claim 18, further comprising a sensor (77), the sensor detecting at least one of a surface velocity of a seed roll being processed by the gin stand, a temperature of at least one portion of the seed roll, a color of at least one portion of the seed roll, and a density of at least one portion of the seed roll.

21. The gin stand of claim 18, further comprising a seed roll monitoring device (77/79), the seed roll monitoring device comprising at least one of a camera and a sensor for detecting a physical property of a seed roll being processed by the gin stand.

22. The gin stand of claim 21, wherein the seed roll monitoring device is coupled to the breast structure.

23. The gin stand of claim 22, wherein the seed roll monitoring device is coupled to the upper roll box door.

24. The gin stand of claim 18, further comprising a third device (98) for moving the breast structure.

25. The gin stand of claim 24, wherein the third device is controlled by the central controller.

26. The gin stand of claim 18, wherein the central controller activates a purge function that comprises automatic activation by the central controller of the first device, second device, and the agitator cylinder.

27. The gin stand of claim 26, wherein the purge function includes the central controller operating the agitator cylinder below production speeds and includes reversing a direction of rotation for the agitator cylinder.

* * * * *